(12) United States Patent
Yamamoto et al.

(10) Patent No.: US 11,056,687 B2
(45) Date of Patent: Jul. 6, 2021

(54) NEGATIVE ELECTRODE ACTIVE MATERIAL, NEGATIVE ELECTRODE, AND BATTERY

(71) Applicant: NIPPON STEEL & SUMITOMO METAL CORPORATION, Tokyo (JP)

(72) Inventors: Sukeyoshi Yamamoto, Tokyo (JP); Tatsuo Nagata, Tokyo (JP); Koji Moriguchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 112 days.

(21) Appl. No.: 16/301,057

(22) PCT Filed: May 18, 2017

(86) PCT No.: PCT/JP2017/018697
§ 371 (c)(1),
(2) Date: Nov. 13, 2018

(87) PCT Pub. No.: WO2017/200046
PCT Pub. Date: Nov. 23, 2017

(65) Prior Publication Data
US 2019/0190021 A1    Jun. 20, 2019

(30) Foreign Application Priority Data

May 18, 2016 (JP) .................................. 2016-099863
Oct. 4, 2016 (JP) .............................. JP2016-196808

(51) Int. Cl.
*H01M 4/38* (2006.01)
*C22C 9/02* (2006.01)
(Continued)

(52) U.S. Cl.
CPC ............... *H01M 4/387* (2013.01); *B22F 1/00* (2013.01); *C22C 9/02* (2013.01); *H01M 4/134* (2013.01);
(Continued)

(58) Field of Classification Search
CPC ............... B22F 1/00; C22C 9/02; H01M 4/80
See application file for complete search history.

(56) References Cited

U.S. PATENT DOCUMENTS 10,038,184 B2 *   7/2018   Yamamoto .......... H01M 10/052
10,128,493 B2 *  11/2018   Yamamoto .............. H01M 4/38
(Continued)

FOREIGN PATENT DOCUMENTS

JP    2015159081 A     9/2015
KR    1020150043462 A  4/2015
(Continued)

OTHER PUBLICATIONS

International Search Report issued in PCT/JP2017/018697, dated Jul. 18, 2017.
(Continued)

*Primary Examiner* — James Lee
(74) *Attorney, Agent, or Firm* — Greer, Burns & Crain, Ltd.

(57) ABSTRACT

A negative electrode active material is provided that is utilized in a nonaqueous electrolyte secondary battery, and that can improve the capacity per volume and charge-discharge cycle characteristics. The negative electrode active material according to the present embodiment contains an alloy having a chemical composition consisting of, in at %, Sn: 13.0 to 24.5% and Si: 3.0 to 15.0%, with the balance being Cu and impurities. The alloy particles contain a phase with a peak of the most intense diffraction line appearing in a range of 42.0 to 44.0 degrees of a diffraction
(Continued)

angle 2θ, the most intense diffraction line being a diffraction line having the largest integrated diffraction intensity in an X-ray diffraction profile. A half-width of the most intense diffraction line of the alloy particles is in a range of 0.15 to 2.5 degrees.

16 Claims, 8 Drawing Sheets

(51) Int. Cl.
  *B22F 1/00* (2006.01)
  *H01M 4/134* (2010.01)
  *H01M 4/36* (2006.01)
  *H01M 10/0525* (2010.01)
  *H01M 4/02* (2006.01)

(52) U.S. Cl.
  CPC ............. *H01M 4/364* (2013.01); *H01M 4/38* (2013.01); *H01M 10/0525* (2013.01); *H01M 2004/027* (2013.01)

(56) References Cited

U.S. PATENT DOCUMENTS

| | | | |
|---|---|---|---|
| 10,230,103 B2 * | 3/2019 | Yamamoto | H01M 4/0471 |
| 10,270,087 B2 * | 4/2019 | Usui | H01M 4/621 |
| 10,270,092 B2 * | 4/2019 | Yamamoto | B32B 15/00 |
| 10,381,640 B2 * | 8/2019 | Yamamoto | C22C 30/04 |
| 2015/0200392 A1 * | 7/2015 | Yamamoto | C22C 30/04 |
| | | | 420/471 |
| 2017/0170461 A1 * | 6/2017 | Yamamoto | H01M 4/38 |

FOREIGN PATENT DOCUMENTS

| | | | | |
|---|---|---|---|---|
| WO | 2013141230 A1 | 9/2013 | | |
| WO | WO-2014034104 A1 * | 3/2014 | ............ | C22C 30/06 |
| WO | 2015129265 A1 | 9/2015 | | |

OTHER PUBLICATIONS

Booth, M.H., et al., Acta Crystallographica, B 33, 1977, 30-36.
Ren Jianguo et al., "Preparation and Properties of Nanometer Cu—Sn Alloy Anode Material for Lithium-ion Batteries," ACTA Metallurgica Sinica, vol. 42, 2006 No. 7, pp. 727-732.

* cited by examiner

MO  M1  M2

NEGATIVE ELECTRODE ACTIVE MATERIAL, NEGATIVE ELECTRODE, AND BATTERY

This is a National Phase Application filed under 35 U.S.C. § 371, of International Application No. PCT/JP2017/018697, filed May 18, 2017, the contents of which are incorporated by reference.

TECHNICAL FIELD

The present invention relates to a negative electrode active material, a negative electrode and a battery.

BACKGROUND ART

Recently, small electronic appliances such as home video cameras, notebook PCs, and smartphones have come into widespread use, and there is a demand to attain a higher capacity and a longer service life of batteries.

Further, due to the widespread use of hybrid vehicles, plug-in hybrid vehicles, and electric vehicles, there is also a demand to make batteries compact.

At present, graphite-based negative electrode active materials are utilized for lithium ion batteries. However, in the case of graphite-based negative electrode active materials, limits exist with respect to lengthening of the service life and compactness.

Accordingly, alloy-based negative electrode active materials that have a higher capacity than graphite-based negative electrode active materials have gained attention. Silicon (Si)-based negative electrode active materials and tin (Sn)-based negative electrode active materials are known as alloy-based negative electrode active materials. Various studies have been conducted on the aforementioned alloy-based negative electrode active materials to realize practical application of lithium ion batteries that have a more compact size and a long service life.

However, an alloy-based negative electrode active material repeatedly undergoes large expansions and contractions at the time of charging/discharging. For that reason, the capacity of the alloy-based negative electrode active material is prone to deteriorate. For example, the volume expansion coefficient of graphite associated with charging is about 12%. In contrast, the volume expansion coefficient of an Si simple substance or an Sn simple substance associated with charging is about 400%. For this reason, if a negative electrode plate of Si simple substance or Sn simple substance is repeatedly subjected to charging and discharging, significant expansion and contraction will occur. In such a case, cracking is caused in a negative electrode compound which is applied on the current collector of the negative electrode plate. Consequently, the capacity of the negative electrode plate rapidly decreases. This is chiefly caused by the fact that some of the negative electrode active material peels off due to volumetric expansion and contraction, and as a result the negative electrode plate loses electron conductivity.

International Application Publication No. WO2013/141230 (Patent Literature 1) discloses porous silicon-composite particles having a three-dimensional network structure. It is described in Patent Literature 1 that expansion/contraction changes in the silicon particles can be suppressed by pores in the three-dimensional network structure.

CITATION LIST

Patent Literature

Patent Literature 1: International Application Publication No. WO2013/141230

SUMMARY OF INVENTION

Technical Problem

However, in Patent Literature 1, as the charge-discharge cycle characteristics of a secondary battery, only a capacity retention ratio up to 50 cycles is shown, and there is a limit to the effect thereof.

It is an objective of the present invention to provide a negative electrode active material which is utilized for nonaqueous electrolyte secondary batteries represented by a lithium ion secondary battery, and which can improve capacity per volume and charge-discharge cycle characteristics.

Solution to Problem

A negative electrode active material according to the present embodiment contains alloy particles having a chemical composition consisting of, in at %, Sn: 13.0 to 24.5% and Si: 3.0 to 15.0%, with the balance being Cu and impurities. The alloy particles contain a phase with a peak of a most intense diffraction line appearing in a range of 42.0 to 44.0 degrees of a diffraction angle 2θ, the most intense diffraction line being a diffraction line having a largest integrated diffraction intensity in an X-ray diffraction profile. A half-width of the most intense diffraction line of the alloy particles is in a range of 0.15 to 2.5 degrees.

Advantageous Effects of Invention

The negative electrode active material according to the present embodiment is capable of improving capacity per volume and charge-discharge cycle characteristics.

DESCRIPTION OF EMBODIMENTS

Figure 1:
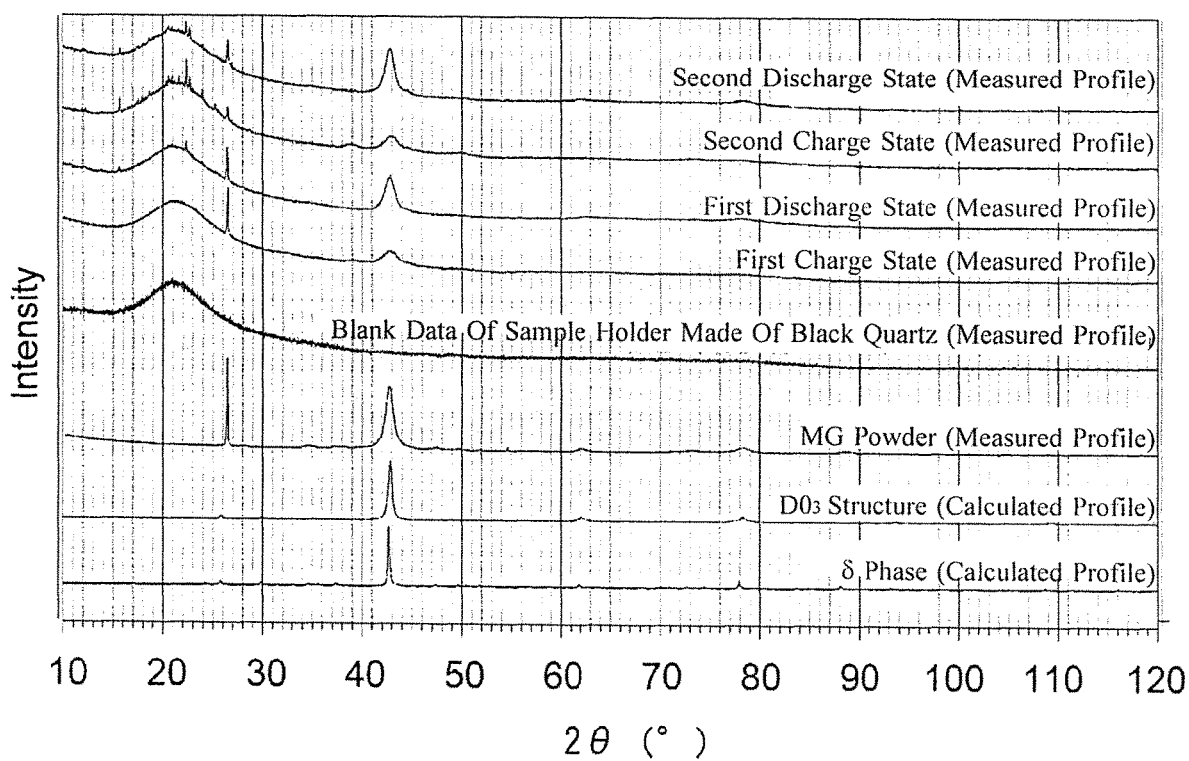
FIG. 1 is a view illustrating changes in X-ray diffraction profiles and a most intense diffraction line after charging and discharging in a Test No. 4 in the examples.

The negative electrode active material according to the present embodiment contains alloy particles having a chemical composition consisting of, in at %, Sn: 13.0 to 24.5% and Si: 3.0 to 15.0%, with the balance being Cu and impurities. The alloy particles contain a phase in which, in an X-ray diffraction profile, a peak of a most intense diffraction line that is a diffraction line having a largest integrated diffraction intensity appears in a range of 42.0 to 44.0 degrees of a diffraction angle 2θ. A half-width of the most intense diffraction line of the alloy particles is in a range of 0.15 to 2.5 degrees.

If a half-width of a most intense diffraction line attributable to a phase (hereunder, also referred to as "specific alloy phase") with a peak of a most intense diffraction line, which is a diffraction line having a largest integrated diffraction intensity (hereunder, referred to simply as "most intense diffraction line") in the X-ray diffraction profile of the alloy particles, appearing within a range of 42.0 to 44.0 degrees of a diffraction angle 2θ is in a range of 0.15 to 2.5 degrees, the size of the crystallite diameter is appropriate. In this case, a storage site of lithium ions appropriately exists, and it is difficult for lithium ions to stabilize at a crystallite boundary region. As a result, it is easy to obtain an excellent discharge capacity and capacity retention ratio.

In the present description, a "negative electrode active material" is preferably a negative electrode active material for a nonaqueous electrolyte secondary battery.

In the negative electrode active material according to the present embodiment, a more preferable Sn content and Si content are a Sn content in a range of 15.5 to 22.5% and an Si content in a range of 3.0 to 9.5%.

The aforementioned chemical composition may further contain, in place of a part of Cu, one or more types of element selected from a group consisting of Ti, V, Cr, Mn, Fe, Co, Ni, Zn, Al, B and C.

The aforementioned chemical composition may further contain, in place of a part of Cu, one or more types of element selected from a group consisting of Ti: 2.0% or less, V: 2.0% or less, Cr: 2.0% or less, Mn: 2.0% or less, Fe: 2.0% or less, Co: 2.0% or less, Ni: 3.0% or less, Zn: 3.0% or less, Al: 3.0% or less, B: 2.0% or less and C: 2.0% or less.

A mean particle diameter of the aforementioned alloy particles is, for example, in terms of median diameter, in a range of 0.1 to 25 μm. If the mean particle diameter D50 of the alloy particles is 0.1 μm or more, the specific surface area of the alloy particles is sufficiently small. In this case, because it is difficult for the alloy particles to oxidize, the initial efficiency increases. On the other hand, if the mean particle diameter D50 of the alloy particles is not more than 25 μm, the reaction area of the alloy particles increases. In addition, it is easy for lithium to be stored as far as the inside of the alloy particles and to be discharged therefrom. Therefore, it is easy to obtain sufficient discharge capacity.

The negative electrode according to the present embodiment contains the negative electrode active material described above. A battery of the present embodiment includes the negative electrode described above.

Hereunder, the negative electrode active material according to the present embodiment will be described in detail.

[Negative Electrode Active Material]

The negative electrode active material of the present embodiment contains an alloy particles (hereunder, referred to as "specific alloy particles"). The chemical composition of the specific alloy particles consists of, in at %, Sn: 13.0 to 24.5% and Si: 3.0 to 15.0%, with the balance being Cu and impurities. A preferable content of Sn is in a range of 15.5 to 22.5%. A preferable content of Si is in a range of 3.0 to 9.5%.

Preferably, the specific alloy particles are the main component (main phase) of the negative electrode active material. Here, the term "main component" means that the volume ratio of the specific alloy particles in the negative electrode active material is not less than 50%. The specific alloy particles may contain impurities within a range that does not cause a deviation from the gist of the present invention. However, it is preferable that the impurities are as few as possible.

The specific alloy particles further contain phases (specific alloy phases) with a peak of the most intense diffraction line appearing within a range of 42.0 to 44.0 degrees of a diffraction angle 2θ in an X-ray diffraction profile. The specific alloy phases are, for example, a phase having a $DO_3$ structure in Strukturbericht notation (hereunder, referred to as "$DO_3$ phase") and a δ phase of F-Cell structure.

When the $DO_3$ phase releases lithium ions, or when the $DO_3$ phase occludes lithium ions, the crystal structure changes and an alloy phase (occlusion phase) having a different crystal structure from the $DO_3$ phase is formed.

The specific alloy particles contain the specific alloy phases prior to occlusion of lithium ions, and after occlusion of lithium ions the specific alloy particles contain an alloy phase (occlusion phase) that is different from the specific alloy phase. That is, the specific alloy particles repeatedly occlude and release lithium ions during charging and discharging. Further, in accordance with the occlusion and release of lithium ions, among the specific alloy phases, the crystal structure of the $DO_3$ phase is changed to an occlusion phase.

The aforementioned change in the crystal structure alleviates strain that arises when the specific alloy particles expand and contract when occluding and releasing lithium ions. Therefore, the occurrence of a situation in which the negative electrode active material peels off from a current collector of a negative electrode due to an accumulation of strain can be suppressed, and a decline in the charge-discharge cycle characteristics can be suppressed.

In the δ phase of the specific alloy particles, changes in the crystal structure when occluding and releasing lithium ions are small. Because of this stability in the crystal structure, expansion and contraction during charging and discharging is suppressed. Therefore, excellent charge-discharge cycle characteristics (capacity retention ratio) are obtained in comparison to the conventional alloy-based negative electrode active materials.

The details of the crystal structure of the occlusion phase are unclear. However, it is considered that the situation is as follows. FIG. 1 is a view illustrating changes in X-ray diffraction profiles and a most intense diffraction line after charging and discharging in a Test No. 4 in examples that are described later. An X-ray diffraction profile of MG powder in FIG. 1 is an X-ray diffraction profile of alloy particles that were subjected to a mechanical grinding (hereunder, referred to as "MG") treatment. Note that, in the X-ray diffraction profiles for first and second charge states and discharge states, a large peak on the low angle side is a peak originating from the glass of the sample holder.

Referring to the X-ray diffraction profile of MG powder in FIG. 1, in a case where X-ray diffraction is performed using Cu-Kα$_1$ radiation as the X-ray radiation source, in the specific alloy phases prior to occlusion of lithium ions, a peak of a most intense diffraction line (hkl: 220 in the case of the D0$_3$ phase, and hkl: 660 in the case of the δ phase) in the X-ray diffraction profile appears in a range of 42.0 to 44.0 degrees. On the other hand, after lithium ion occlusion after charging, the diffraction profile of the most intense diffraction line broadens (width of the peak widens) (first and second charge states in FIG. 1). After the release of lithium ions after discharging, the diffraction profile of the most intense diffraction line is sharpened (width of the peak narrows) again (first and second discharge states in FIG. 1). Based on the reversible behavior described above, it is considered that changes in the crystal structure accompanying charging and discharging are small.

As described above, in the specific alloy phases, changes in the crystal structure accompanying occlusion and release of lithium ions are small. As a result, it is difficult for the negative electrode active material to peel off from a current collector, and high charge-discharge cycle characteristics can be maintained.

Figure 2:
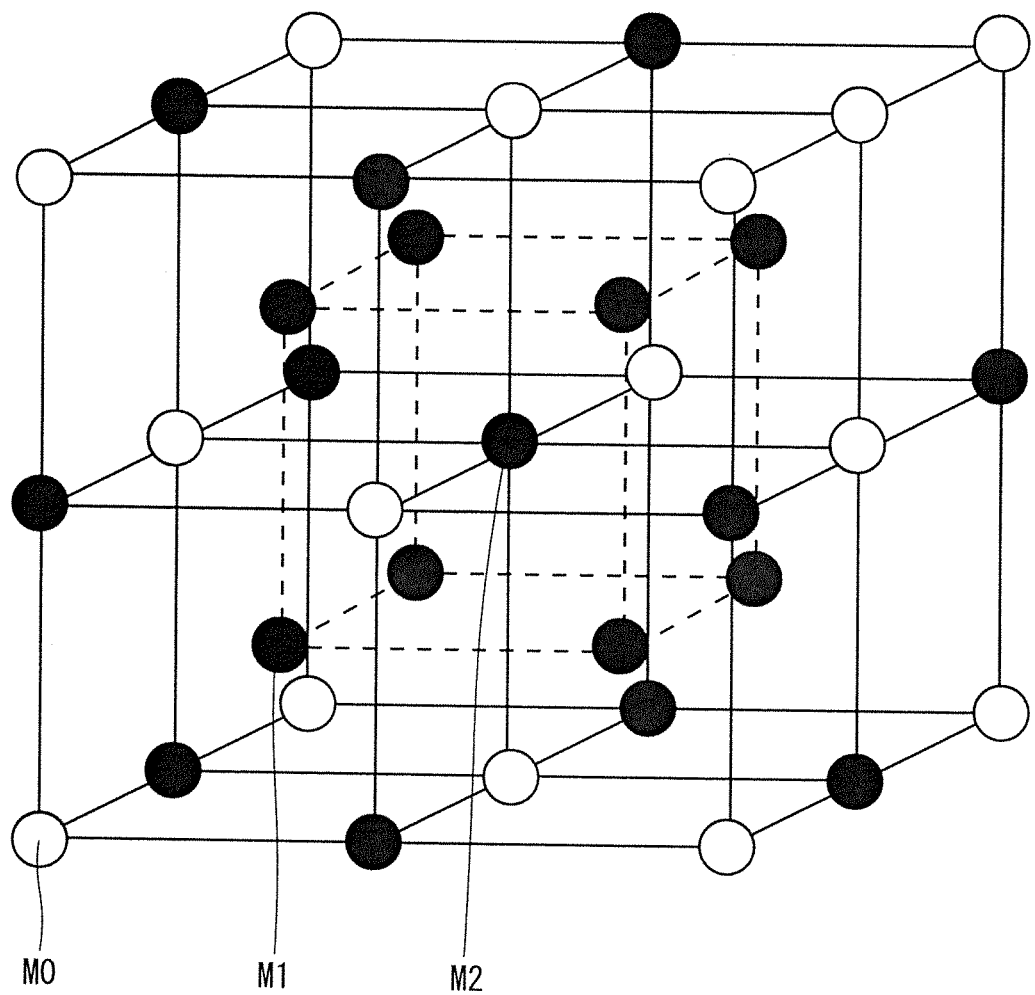
FIG. 2 is a view illustrating a crystal lattice having a D0$_3$ structure in Strukturbericht notation.

The D0$_3$ phase is one type of nonequilibrium phase. The D0$_3$ structure is an ordered structure as shown in FIG. 2, and is a cubic crystal. For example, Sn or Si is located at atomic sites M0 shown by a white circle in FIG. 2. For example, Cu is located at atomic sites M1 shown by a black circle. For example, Cu or Si is located at atomic sites M2 shown by a black circle. Such a crystal structure corresponds to No. 225 (Fm-3m) of International Tables (Volume-A) in the classification of space groups. An example of the lattice constant and atomic coordinates of the D0$_3$ structure belonging to this space group number is shown in Table 1. However, elements located at the sites M0, M1 and M2 that are shown in Table 1 can be substituted according to the chemical composition of the alloy particles. Specifically, in a case where the chemical composition of the alloy particles is Cu-20 at % Sn-8 at % Si, as described in the "atom ratio within site" column in Table 1, the arrangement of the elements can be substituted so as to be Sn-20 at % Cu at M0, Cu at M1, and Cu-12 at % Si at M2. Further, the numerical value of the lattice constant "a" described in Table 1 may be changed according to the chemical composition. In addition, the atomic coordinates as well as the numerical values for occupancy of the respective sites shown in Table 1 may be changed according to the chemical composition of the alloy.

TABLE 1

Crystal Structure: D0$_3$, composition: Cu-20 at % Sn-8 at % Si
Space Group Number (International Table A): No. 225 (Fm 3 m)
Lattice Constant: a = 5.925 Å
(Analysis result of Test No. 4: after refinement)

| Site Name | Atom Ratio Within Site | Multiplicity/Wyckoff Symbol | Atomic Coordinates | | |
|---|---|---|---|---|---|
| | | | x | y | z |
| M0 | Sn-20at % Si | 4a | 0.0 | 0.0 | 0.0 |
| M1 | Cu | 8c | ¼ | ¼ | ¼ |
| M2 | Cu-12at % Si | 4b | ½ | ½ | ½ |

The crystal structure of the δ phase is a cubic crystal, and is equivalent to a crystal structure model of γ-Brass phase shown in "Booth, Acta Crystal Iographica, B, 33, 1977, 30" that is Non Patent Literature, and corresponds to No. 216 (F-43m) of International Tables (Volume-A) in the classification of space groups. An example of the lattice constant and atomic coordinates of the crystal structure of δ phase belonging to this space group number is shown in Table 2. With regard to the atomic coordinates and crystallographic axis, values are adopted that are obtained by shifting the origin (½, ½, ½) with respect to the information of the reference source and normalizing the values. In the case of the δ phase of a Cu—Sn binary system, Cu is located at the respective sites of DCO, CCO, ACO, BOH, COH, AOH, CIT, DOT, DIT, AIT, BOT, BIT and COT, and Sn is located at the respective sites of BCO, DOH and AOT. The elements located at the respective sites can be substituted according to the chemical composition of the alloy particles. Specifically, in a case where the chemical composition of the alloy particles is Cu-17 at % Sn-5 at % Si, as described in the "atom ratio within site" column in Table 2, the arrangement of the elements can be substituted so as to obtain a ratio of Cu-9.5 at % Sn at the respective sites of DCO, CCO, ACO, BOH, COH, AOH, CIT, DOT, DIT, AIT, BOT, BIT and COT, and to obtain a ratio of Sn-31.2 at % Si at the respective sites of BCO, DOH and AOT. The numerical value of the lattice constant "a" shown in Table 2 may be changed according to the chemical composition of the alloy. The atomic coordinates as well as the numerical values for occupancy of the respective sites shown in Table 2 may also be changed according to the chemical composition of the alloy.

TABLE 2

δ Phase Cubic Crystal (cubic: F-cell) Composition: Cu-17 at % Sn-5 at % Si
Space Group Number (International Table A): No. 216 (F43m)
Lattice Constant: a = 17.98 Å (Analysis result of Test No. 6: after refinement)

| Site | Atom Ratio Within Site | Multiplicity/ Wyck | Atomic Coordinates | | | Occupancy |
|---|---|---|---|---|---|---|
| | | | x | y | z | |
| DCO | Cu-9.5at % Sn | 48h | 0.0913 | 0.0913 | 0.2631 | 1.00 |
| BCO | Sn-31.2at % Si | 48h | 0.0916 | 0.0916 | 0.7680 | 1.00 |
| CCO | Cu-9.5at % Sn | 48h | 0.1465 | 0.1465 | 0.0278 | 1.00 |
| ACO | Cu-9.5at % Sn | 48h | 0.1562 | 0.1562 | 0.5186 | 1.00 |
| DOH | Sn-31.2at % Si | 24g | 0.0691 | 0.2500 | 0.2500 | 1.00 |
| BOH | Cu-9.5at % Sn | 24g | 0.5759 | 0.2500 | 0.2500 | 1.00 |
| COH | Cu-9.5at % Sn | 24f | 0.1765 | 0.0000 | 0.0000 | 1.00 |
| AOH | Cu-9.5at % Sn | 24f | 0.3237 | 0.0000 | 0.0000 | 1.00 |
| CIT | Cu-9.5at % Sn | 16e | 0.0504 | 0.0504 | 0.0504 | 1.00 |
| DOT | Cu-9.5at % Sn | 16e | 0.1664 | 0.1664 | 0.1664 | 1.00 |
| DIT | Cu-9.5at % Sn | 16e | 0.3062 | 0.3062 | 0.3062 | 1.00 |
| AOT | Sn-31.2at % Si | 16e | 0.4113 | 0.4113 | 0.4113 | 1.00 |
| AIT | Cu-9.5at % Sn | 16e | 0.5573 | 0.5573 | 0.5573 | 0.75 |
| BOT | Cu-9.5at % Sn | 16e | 0.6657 | 0.6657 | 0.6657 | 1.00 |

TABLE 2-continued

δ Phase Cubic Crystal (cubic: F-cell) Composition: Cu-17 at % Sn-5 at % Si
Space Group Number (International Table A): No. 216 (F43m)
Lattice Constant: a = 17.98 Å (Analysis result of Test No. 6: after refinement)

| Site | Atom Ratio Within Site | Multiplicity/ Wyck | Atomic Coordinates x | y | z | Occupancy |
|---|---|---|---|---|---|---|
| BIT | Cu-9.5at % Sn | 16e | 0.8005 | 0.8005 | 0.8005 | 1.00 |
| COT | Cu-9.5at % Sn | 16e | 0.9166 | 0.9166 | 0.9166 | 1.00 |

Structure Model Source: Booth, Acta Crystallographica, B 33, 1977, 30

[Method for Analyzing Crystal Structure of Specific Alloy Particles]

The crystal structure of phases contained in the negative electrode active material (also including a case where specific alloy particles are contained) can be analyzed by the Rietveld method based on an X-ray diffraction profile obtained using an X-ray diffraction apparatus. Specifically, the crystal structure is analyzed by the following methods.

(1) The negative electrode active material prior to being used for a negative electrode is subjected to X-ray diffraction measurement to thereby obtain measured data of X-ray diffraction profiles. Specifically, alloy particles obtained by a pulverization treatment in a state before an MG treatment (hereunder, also referred to as "as-pulverized alloy particles") are subjected to X-ray diffraction measurement, and the crystal structures of phases in the negative electrode active material are analyzed by the Rietveld method based on the obtained X-ray diffraction profiles (measured data). Either one of "RIETAN-2000" (program name) and "RIETAN-FP" (program name) which are general-purpose analytical software is used for the analysis by the Rietveld method.

(2) With regard to alloy particles obtained by performing an MG treatment on as-pulverized alloy particles (hereunder, also referred to as "post-MG alloy particles"), X-ray diffraction measurement is performed thereon, and a half-width of the most intense diffraction line (hereunder, also referred to simply as "half-width") is calculated by a method described later based on the obtained X-ray diffraction profile (measured data).

(3) X-ray diffraction measurement is performed on a negative electrode active material inside a negative electrode before charging in a battery, and measured data of an X-ray diffraction profile is obtained. Specifically, the battery, which is in an uncharged state, is disassembled within a glove box in argon atmosphere, and the negative electrode is taken out from the battery. The negative electrode that was taken out is enclosed with Mylar foil. Thereafter, the circumference of the Mylar foil is sealed using a thermocompression bonding machine. The negative electrode that is sealed by the Mylar foil is then taken out from the glove box. For the argon atmosphere inside the glove box, argon gas is used that is supplied by a cylinder of ultra-high purity argon gas that has a purity of 99.9999% or more. In addition, the argon gas is passed through a purification apparatus that employs a catalyst or the like to thereby prevent inclusion of external impurities such as nitrogen. By this means, the dew point is controlled to be −60° C. or less, and a change in the properties of the negative electrode active material due to nitrogen or moisture is prevented.

Next, a measurement sample is fabricated by bonding the negative electrode to a reflection-free sample plate (a plate of a silicon single crystal which is cut out such that a specific crystal plane is parallel with the measurement plane) with hair spray. The measurement sample is mounted onto the X-ray diffraction apparatus, and X-ray diffraction measurement of the measurement sample is performed to obtain an X-ray diffraction profile. Based on the obtained X-ray diffraction profile, the constituent phases of the negative electrode active material in the negative electrode (hereunder, also referred to simply as "constituent phases") are identified.

(4) X-ray diffraction profiles of the negative electrode active material in the negative electrode after charging one to multiple times and after discharging one to multiple times are also measured by the same method as in (3), and a most intense diffraction line of the negative electrode active material during charging is specified. If the peak of the most intense diffraction line before charging appears in a range of 42.0 to 44.0 degrees, and the peak of the most intense diffraction line is broader than the peak of the most intense diffraction line before charging, it can be determined that the specific alloy phase is a phase of a charged state. Further, when the peak location of the most intense diffraction line of the negative electrode active material during discharging is identified, if the peak of the most intense diffraction line approaches a sharp state of prior to charging, it can be determined that the specific alloy phase changed to a phase of a discharged state.

Specifically, the battery is fully charged in a charging/discharging test apparatus. The fully charged battery is disassembled in a glove box, and a measurement sample is fabricated by a similar method to that of (3). The measurement sample is mounted onto the X-ray diffraction apparatus and X-ray diffraction measurement is performed.

Further, the battery is fully discharged, and the fully discharged battery is disassembled in the glove box and a measurement sample is fabricated by a similar method to that of (3) to perform X-ray diffraction measurement.

With respect to an X-ray diffraction measurement for analyzing changes in the constituent phases accompanying charging and discharging, measurement can also be performed by the following method. A coin battery before charging or before and after charging and discharging is disassembled in an inert atmosphere other than nitrogen, such as argon, and an active material mixture (negative electrode active material) that is coated on the electrode plate of the negative electrode is peeled off from over a current collector foil using a spatula or the like. The negative electrode active material that is peeled off is loaded into an X-ray diffraction sample holder. By using a dedicated attachment which is capable of sealing the negative electrode active material in an inert gas atmosphere, it is possible to perform X-ray diffraction measurement in an inert gas atmosphere even in a state in which the negative electrode active material is mounted on an X-ray diffraction apparatus. By this means, while eliminating the influence of an oxidative action in the atmosphere, X-ray diffraction profiles can be measured from different states of the crystal structure before and after charging and discharging of the negative electrode active material. According to this method, because diffraction lines deriving from the copper foil of the current collector and the like are eliminated, from the viewpoint of the analysis there is the advantage that it is easy to distinguish diffraction lines deriving from the active material.

[Regarding Half-Width of Most Intense Diffraction Line of X-Ray Diffraction Profile]

In the aforementioned negative electrode active material, in the X-ray diffraction profile of the post-MG alloy particles, the half-width of the most intense diffraction line (hereunder, referred to simply as "half-width") is in a range of 0.15 to 2.5 degrees in terms of the diffraction angle $2\theta$. Diffraction lines that have the most intense diffraction line mainly originate from the $D0_3$ phase or $\delta$ phase. If the half-width is less than 0.15 degrees, the discharge capacity and initial efficiency decrease. On the other hand, if the half-width is greater than 2.5 degrees, the capacity retention ratio will decrease. If the half-width is in the range of 0.15 to 2.5 degrees, the capacity retention ratio can be increased while also increasing the discharge capacity and initial efficiency.

The reason for the above described situation is considered to be as follows. The half-width is an index of the average size (crystallite diameter) of crystallite (smallest region that can be regarded as a single crystal). In particular, in powder X-ray diffraction, the individual crystallites constituting the powder particles can be regarded as regions of the smallest unit that contributes to diffraction with respect to incident X-rays. The crystallite boundary regions function as diffusion paths of lithium at the time of charging and discharging. The crystallite boundary regions also function as lithium storage sites.

In a case where the half-width is too narrow, the crystallite diameter is excessively large. In this case, the numerical density of storage sites decreases, and the discharge capacity declines. In addition, in many cases the initial efficiency has a positive correlation with the discharge capacity. Consequently, if the crystallite diameter becomes large, the initial efficiency also decreases together with a decrease in the discharge capacity. In a case where the discharge capacity is small, it is considered that a ratio at which lithium that is temporarily incorporated into the active material by the initial charging stabilizes increases, and as a result the lithium in the active material cannot be taken out therefrom during discharging.

On the other hand, in a case where the half-width is too wide, the crystallite diameter is excessively small. In this case, it is considered that, although the initial capacity increases, the ratio at which lithium stabilizes at the crystallite boundary regions is liable to increase as the charge-discharge cycle proceeds. It is considered that, as a result, the capacity retention ratio decreases.

As described above, there is a tendency for the half-width to widen as the crystallite diameter decreases. This phenomenon can be quantitatively evaluated by means of the Scherrer equation. The Scherrer equation is as follows.

$$D = (K \cdot \lambda) / \{B \cdot \cos \theta\}$$

D: crystallite diameter (nm)
K: Scherrer constant (dimensionless)
$\lambda$: wavelength of X-rays (nm)
B: half-width derived from material (radian)
B=$B_{obs}$−b
$B_{obs}$: measured half-width (radian)

b: mechanical half-width attributed to X-ray diffraction apparatus (radian)
$\theta$: diffraction angle during X-ray diffraction measurement by $\theta$-$2\theta$ method (radian)

In the present description, the Scherrer constant K=0.94 is used. The wavelength ($\lambda$) of the X-ray for measurements is monochromated to Cu-K$\alpha_1$. A value of $\lambda$=0.15401 nm is adopted as a value corresponding to the wavelength thereof. The mechanical half-width b attributed to the X-ray diffraction apparatus is measured using a standard sample of $LaB_6$ crystal having a sufficiently large crystallite diameter. The value b=8.73×$10^{-4}$ radian (0.05 degrees) is used as a correction value for the vicinity of the target $2\theta$ region. Therefore, when simply the term "half-width" is used in the present description, it refers not to an actually measured half-width ($B_{obs}$), but to the half-width after the aforementioned correction, that is, the half-width (B=$B_{obs}$−b) derived from the material. In addition, although for convenience the unit thereof is described as "degrees" in the text of the present description, the unit "radian" is used for the aforementioned calculation.

A preferable lower limit of the half-width is 0.3 degrees, and more preferably is 0.5 degrees, and further preferably is 0.7 degrees. A preferable upper limit of the half-width is 2.2 degrees, and more preferably is 2.0 degrees. The same applies with respect to the negative electrode active material in a discharged state after repeating charging and discharging.

Note that, a preferable range of the crystallite diameter is 3 to 90 nm. A preferable lower limit of the crystallite diameter is 4 nm, and more preferably is 5 nm. A preferable upper limit of the crystallite diameter is 40 nm, more preferably is 20 nm, and further preferably is 15 nm. The same applies with respect to the negative electrode active material in a discharged state after repeating charging and discharging.

[Regarding Optional Elements]

As long as the aforementioned specific alloy particles can have specific alloy phases, the chemical composition of the specific alloy particles may contain one or more types of element selected from a group consisting of Ti, V, Cr, Mn, Fe, Co, Ni, Zn, Al, B and C in place of a part of Cu.

Preferably, the aforementioned chemical composition may contain, in place of a part of Cu, one or more types of element selected from a group consisting of Ti: 2.0 at % or less, V: 2.0 at % or less, Cr: 2.0 at % or less, Mn: 2.0 at % or less, Fe: 2.0 at % or less, Co: 2.0 at % or less, Ni: 3.0 at % or less, Zn: 3.0 at % or less, Al: 3.0 at % or less, B: 2.0 at % or less and C: 2.0 at % or less. The aforementioned Ti, V, Cr, Mn, Fe, Co, Ni, Zn, Al, B and C are optional elements.

As described above, a preferable upper limit of the Ti content is 2.0 at %. A further preferable upper limit of the Ti content is 1.0 at %, and more preferably is 0.5 at %. A preferable lower limit of the Ti content is 0.01 at %, more preferably is 0.05 at %, and further preferably is 0.1 at %.

As described above, a preferable upper limit of the V content is 2.0 at %. A more preferable upper limit of the V content is 1.0 at %, and further preferably is 0.5 at %. A preferable lower limit of the V content is 0.01 at %, more preferably is 0.05 at %, and further preferably is 0.1 at %.

As described above, a preferable upper limit of the Cr content is 2.0 at %. A more preferable upper limit of the Cr content is 1.0 at %, and further preferably is 0.5 at %. A preferable lower limit of the Cr content is 0.01 at %, more preferably is 0.05 at %, and further preferably is 0.1 at %.

As described above, a preferable upper limit of the Mn content is 2.0 at %. A more preferable upper limit of the Mn content is 1.0 at %, and further preferably is 0.5 at %. A preferable lower limit of the Mn content is 0.01 at %, more preferably is 0.05 at %, and further preferably is 0.1 at %.

As described above, a preferable upper limit of the Fe content is 2.0 at %. A more preferable upper limit of the Fe content is 1.0 at %, and further preferably is 0.5 at %. A preferable lower limit of the Fe content is 0.01 at %, more preferably is 0.05 at %, and further preferably is 0.1 at %.

As described above, a preferable upper limit of the Co content is 2.0 at %. A more preferable upper limit of the Co content is 1.0 at %, and further preferably is 0.5 at %. A preferable lower limit of the Co content is 0.01 at %, more preferably is 0.05 at %, and further preferably is 0.1 at %.

As described above, a preferable upper limit of the Ni content is 3.0 at %. A more preferable upper limit of the Ni content is 2.0 at %. A preferable lower limit of the Ni content is 0.1 at %.

As described above, a preferable upper limit of the Zn content is 3.0 at %. A more preferable upper limit of the Zn content is 2.0 at %. A preferable lower limit of the Zn content is 0.1 at %, more preferably is 0.5 at %, and further preferably is 1.0 at %.

As described above, a preferable upper limit of the Al content is 3.0 at %. A more preferable upper limit of the Al content is 2.0 at %, and further preferably is 1.0 at %. A preferable lower limit of the Al content is 0.1%, more preferably is 0.5 at %, and further preferably is 1.0 at %.

A preferable upper limit of the B content is 2.0 at %. A more preferable upper limit of the B content is 1.0 at %, and further preferably is 0.5 at %. A preferable lower limit of the B content is 0.01 at %, more preferably is 0.05 at %, and further preferably is 0.1 at %.

A preferable upper limit of the C content is 2.0 at %. A more preferable upper limit of the C content is 1.0 at %, and further preferably is 0.5 at %. A preferable lower limit of the C content is 0.01 at %, more preferably is 0.05 at %, and further preferably is 0.1 at %.

[Mean Particle Diameter of Specific Alloy Particles]

The particle diameter of the alloy particles influences the discharge capacity of the battery. The smaller that the particle diameter is, the more preferable. This is because, if the particle diameter is small, the total area of the negative electrode active material included in the negative electrode plate can be made large. Therefore, the mean particle diameter of the specific alloy particles is preferably a median diameter (D50) of not more than 25 μm. In this case, the reaction area of the particles increases. In addition, the occlusion of lithium as far as the inside of the particles as well as the discharge of lithium therefrom is facilitated. Consequently, it is easy to obtain sufficient discharge capacity. On the other hand, if the mean particle diameter is a median diameter (D50) of not less than 0.1 μm, the specific surface area of the particles will be sufficiently small, and it will be difficult for oxidation to occur. Therefore, in particular, the initial efficiency will increase. Accordingly, a preferable mean particle diameter of the specific alloy particles is, in terms of the median diameter (D50), in a range of 0.1 to 25 μm.

A preferable lower limit of the mean particle diameter is 0.4 and more preferably is 1.0 μm. A preferable upper limit of the mean particle diameter is 22 μm, and more preferably is 18 μm.

The mean particle diameter can be measured as follows. In a case where the mean particle diameter is 10 μm or more in terms of the median diameter (D50), the mean particle diameter is determined by a gasflow-type high-speed dynamic image analysis method. An analyzer with the trade name Camsizer X manufactured by Verder Scientific Co., Ltd. is used for the analysis.

In a case where the mean particle diameter is less than 10 μm in terms of the median diameter (D50), the mean particle diameter is measured using a laser particle size distribution analyzer. A particle size distribution analyzer with the trade name "Microtrac particle size distribution analyzer" that is manufactured by Nikkiso Co., Ltd. is used as the laser particle size distribution analyzer.

[Material Other than Specific Alloy Particles Contained in Negative Electrode Active Material]

The aforementioned negative electrode active material may contain a material other than the specific alloy particles. For example, in addition to the specific alloy particles, the negative electrode active material may contain graphite as an active material.

[Methods for Producing Negative Electrode Active Material and Negative Electrode]

Methods for producing the aforementioned negative electrode active material containing the specific alloy particles, and a negative electrode and a battery that use the negative electrode active material will now be described. The method for producing the negative electrode active material includes a process of preparing a molten metal (preparation process), a process of rapidly cooling the molten metal to produce a thin metal strip (thin metal strip production process), and a process of performing an MG treatment on the thin metal strip (MG treatment process).

[Preparation Process]

In the preparation process, a molten metal having the aforementioned chemical composition is produced. The molten metal is produced by melting raw material by a well-known melting method such as arc melting or resistance heating melting.

[Thin Metal Strip Production Process]

Figure 3:
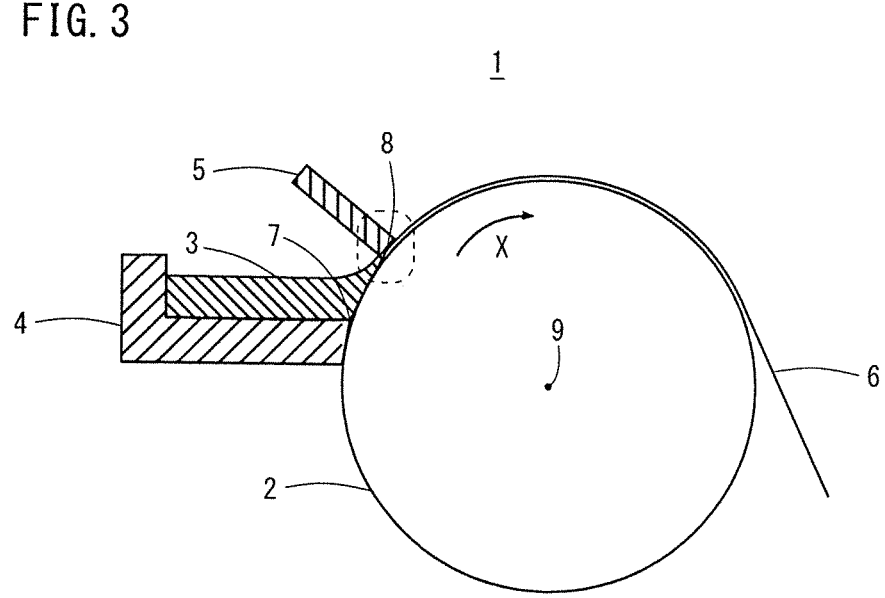
FIG. 3 is a view illustrating a production apparatus for producing alloy particles of the present embodiment.

Next, a thin metal strip is produced using a production apparatus illustrated in FIG. 3. A production apparatus 1 includes a cooling roll 2, a tundish 4 and a blade member 5. The method for producing the negative electrode active material of the present embodiment is, for example, a strip casting (SC) method that includes the blade member 5.

[Cooling Roll]

The cooling roll 2 has an outer peripheral surface, and cools and solidifies the molten metal 3 on the outer peripheral surface while rotating. The cooling roll 2 includes a cylindrical body portion and an unshown shaft portion. The body portion has the aforementioned outer peripheral surface. The shaft portion is disposed at a central axis position of the aforementioned body portion, and is attached to an unshown driving source. The cooling roll 2 is driven by the driving source to rotate around a central axis 9 of the cooling roll 2.

The starting material of the cooling roll 2 is preferably a material with high hardness and high thermal conductivity. The starting material of the cooling roll 2 is, for example, copper or a copper alloy. Preferably, the starting material of the cooling roll 2 is copper. The cooling roll 2 may also have a coating on the surface thereof. By this means, the hardness of the cooling roll 2 increases. The coating is, for example, a plating coating or a cermet coating. The plating coating is, for example, chrome plating or nickel plating. The cermet coating contains, for example, one or more types selected from a group consisting of tungsten (W), cobalt (Co), titanium (Ti), chromium (Cr), nickel (Ni), silicon (Si), aluminum (Al), and boron (B) as well as carbides, nitrides and carbo-nitrides of these elements. Preferably, the outer layer of the cooling roll 2 is copper, and the cooling roll 2 also has a chrome plating coating on the surface thereof.

The character X shown in FIG. 3 denotes the rotational direction of the cooling roll 2. When producing the thin metal strip 6, the cooling roll 2 rotates in the fixed direction X. By this means, in the example illustrated in FIG. 3, a part of the molten metal 3 that contacts the cooling roll 2 is solidified on the outer peripheral surface of the cooling roll 2 and moves accompanying rotation of the cooling roll 2.

The peripheral speed of the cooling roll 2 is appropriately set in consideration of the cooling rate of the molten metal 3 and the efficiency of production. If the peripheral speed of the roll is slow, the efficiency of production decreases. If the peripheral speed of the roll is fast, the thin metal strip 6 is liable to peel off from the outer peripheral surface of the cooling roll 2. Consequently, the time period for which the thin metal strip 6 is in contact with the outer peripheral surface of the cooling roll 2 is shortened. In this case, the thin metal strip 6 is air-cooled without being subjected to heat dissipation by the cooling roll 2. In a case where the thin metal strip 6 is air-cooled, a sufficient cooling rate is not obtained. Therefore, in some cases the thin metal strip 6 that has fine crystallites is not obtained. Accordingly, a lower limit of the peripheral speed of the roll is preferably 50 m/min, more preferably is 80 m/min, and further preferably is 120 m/min. Although an upper limit of the peripheral speed of the roll is not particularly limited, in consideration of the equipment capacity the upper limit is, for example, 500 m/min. The peripheral speed of the roll can be determined based on the diameter and number of rotations of the roll.

A solvent for heat dissipation may be filled inside the cooling roll 2. By this means, the molten metal 3 can be efficiently cooled. The solvent is, for example, one or more types selected from a group consisting of water, organic solvents and oil. The solvent may be retained inside the cooling roll 2 or may be circulated with the exterior thereof.

[Tundish]

The tundish 4 is capable of receiving the molten metal 3, and supplies the molten metal 3 onto the outer peripheral surface of the cooling roll 2.

The shape of the tundish 4 is not particularly limited as long as it is capable of supplying the molten metal 3 onto the outer peripheral surface of the cooling roll 2. The shape of the tundish 4 may be a box shape in which the upper part is open as illustrated in FIG. 3, or may be another shape.

The tundish 4 includes a feed end 7 that guides the molten metal 3 onto the outer peripheral surface of the cooling roll 2. After the molten metal 3 is supplied to the tundish 4 from an unshown crucible, the molten metal 3 is supplied onto the outer peripheral surface of the cooling roll 2 by way of the feed end 7. The shape of the feed end 7 is not particularly limited. A cross-section of the feed end 7 may be a rectangular shape as illustrated in FIG. 3, or may be a shape that has an inclination. The feed end 7 may be a nozzle shape.

Preferably, the tundish 4 is disposed in the vicinity of the outer peripheral surface of the cooling roll 2. By this means the molten metal 3 can be stably supplied onto the outer peripheral surface of the cooling roll 2. A gap between the tundish 4 and the cooling roll 2 is appropriately set within a range such that the molten metal 3 does not leak.

The starting material of the tundish 4 is preferably a refractory material. The tundish 4, for example, contains one or more types of element selected from a group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$).

[Blade Member]

The blade member 5 is disposed on the downstream side in the rotational direction of the cooling roll 2 relative to the tundish 4, in a manner so that a gap is provided between the blade member 5 and the outer peripheral surface of the cooling roll 2. The blade member 5, for example, is a plate-like member disposed parallel to the axial direction of the cooling roll 2.

Figure 4:
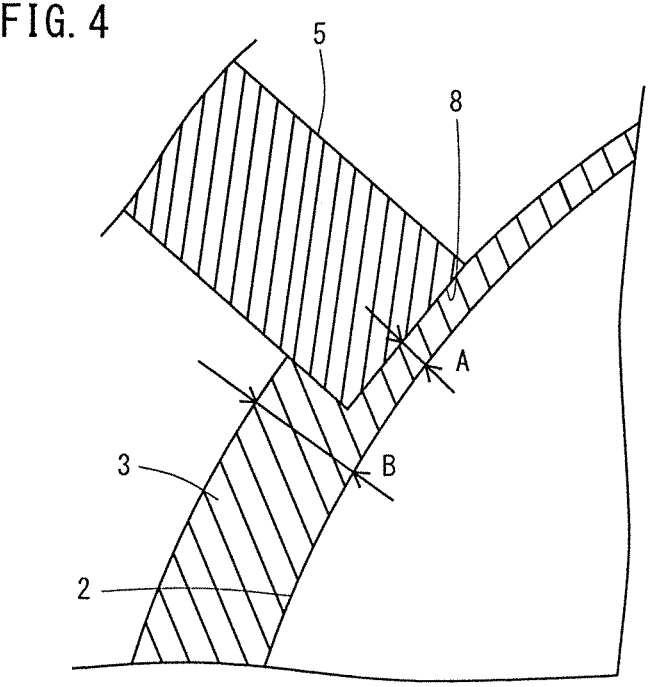
FIG. 4 is an enlarged view of a region indicated by a dashed line in FIG. 3.

FIG. 4 is a cross-sectional view illustrating, in an enlarged manner, the vicinity of the front end (area enclosed by a dashed line in FIG. 3) of the blade member 5 of the production apparatus 1. Referring to FIG. 4, the blade member 5 is disposed in a manner in which a gap A is provided between the blade member 5 and the outer peripheral surface of the cooling roll 2. The blade member 5 regulates the thickness of the molten metal 3 on the outer peripheral surface of the cooling roll 2 so as to be a thickness corresponding to the width of the gap A between the outer peripheral surface of the cooling roll 2 and the blade member 5. Specifically, in some cases the molten metal 3 that is further upstream in the rotational direction of the cooling roll 2 than the blade member 5 is thicker than the width of the gap A. In such a case, the molten metal 3 of an amount corresponding to a thickness that is more than the width of the gap A is held back by the blade member 5. By this means, the thickness of the molten metal 3 is thinned to the width of the gap A. The cooling rate of the molten metal 3 increases as a result of the thickness of the molten metal 3 becoming thinner. Therefore, the grains and crystallites of the thin metal strip 6 are refined.

The width of the gap A is preferably narrower than a thickness B of the molten metal 3 on the outer peripheral surface on the upstream side in the rotational direction of the cooling roll 2 relative to the blade member 5. In this case, the molten metal 3 on the outer peripheral surface of the cooling roll 2 becomes thinner. Therefore, the cooling rate of the molten metal 3 increases further. As a result, the grains and crystallites of the thin metal strip 6 are more refined.

The width of the gap A between the outer peripheral surface of the cooling roll 2 and the blade member 5 is the shortest distance between the blade member 5 and the outer peripheral surface of the cooling roll 2. The width of the gap A is appropriately set in accordance with the intended cooling rate and efficiency of production. The narrower that the width of the gap A is, the thinner that the molten metal 3 becomes after thickness adjustment. Therefore, the narrower that the gap A is, the more that the cooling rate of the molten metal 3 will increase. As a result, it will be easier to make the grains of the thin metal strip 6 finer. Accordingly, the upper limit of the gap A is preferably 100 μm, and more preferably is 50 μm.

On the outer peripheral surface of the cooling roll 2, the distance between a location at which the molten metal 3 is supplied from the tundish 4 and a location at which the blade member 5 is disposed is set as appropriate. It suffices that the blade member 5 is disposed in an area within which the free surface of the molten metal 3 (surface on the side on which the molten metal 3 does not contact the cooling roll 2) comes in contact with the blade member 5 in a liquid or semisolid state.

Figure 5:
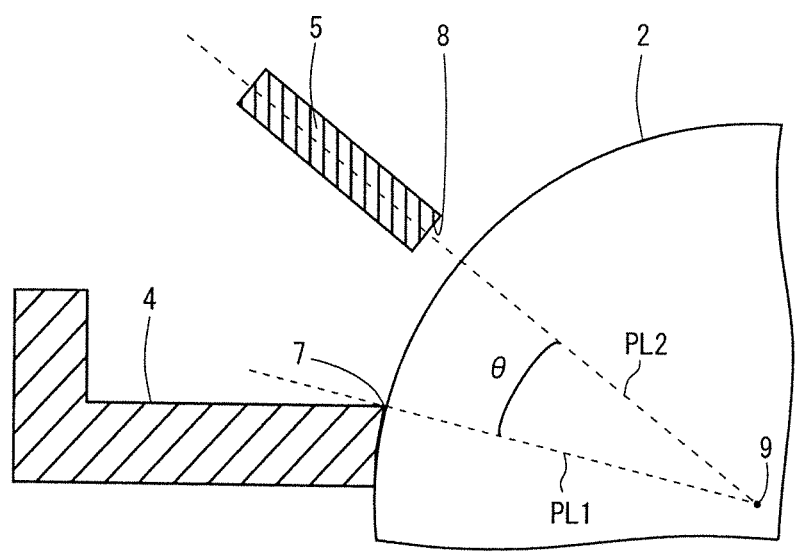
FIG. 5 is a schematic diagram for describing the positional relation between a tundish and a blade member shown in FIG. 3.

FIG. 5 is a view illustrating a mounting angle of the blade member 5. Referring to FIG. 5, for example the blade member 5 is disposed so that an angle θ formed by a plane PL1 that includes the central axis 9 of the cooling roll 2 and the feed end 7 and a plane PL2 that includes the central axis 9 of the cooling roll 2 and the front end portion of the blade member 5 is constant (hereunder, this angle θ is referred to as "mounting angle θ"). The mounting angle θ can be set as appropriate. The upper limit of the mounting angle θ is, for example, 45 degrees. The upper limit of the mounting angle θ is preferably 30 degrees. Although the lower limit of the mounting angle θ is not particularly limited, the lower limit is preferably within a range such that the blade member 5 does not directly contact the molten metal 3 on the tundish 4.

Referring to FIG. 3 to FIG. 5, preferably the blade member 5 has a heat dissipation face 8. The heat dissipation face 8 is disposed facing the outer peripheral surface of the cooling roll 2. The heat dissipation face 8 contacts the molten metal 3 that passes through the gap between the outer peripheral surface of the cooling roll 2 and the blade member 5.

The starting material of the blade member 5 is preferably a refractory material. The blade member 5, for example, contains one or more types of element selected from a group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$). Preferably, the blade member 5 contains one or more types of element selected from a group consisting of aluminum oxide ($Al_2O_3$), silicon dioxide ($SiO_2$), aluminum titanate ($Al_2TiO_5$) and magnesium oxide (MgO).

A plurality of blade members 5 may be disposed consecutively with respect to the rotational direction of the cooling roll 2. In this case, the load applied to a single blade member 5 decreases. In addition, the accuracy with respect to the thickness of the molten metal 3 can be enhanced.

In the production apparatus 1 described above, the thickness of the molten metal 3 on the outer peripheral surface of the cooling roll 2 is regulated by the blade member 5. Therefore, the molten metal 3 on the outer peripheral surface of the cooling roll 2 becomes thin. Because the molten metal 3 becomes thin, the cooling rate of the molten metal 3 increases. Therefore, by using the production apparatus 1 to produce thin metal strips, the thin metal strip 6 having more refined crystallites can be produced. In the case of using the production apparatus 1 described above, a preferable average cooling rate is 100° C./sec or more. The average cooling rate in this case is calculated by the following equation.

Average cooling rate=(molten metal temperature−temperature of thin metal strip when rapid cooling ends)/rapid cooling time period In a case where the thin metal strip is produced by an apparatus that does not include the blade member 5, that is, when strip casting (SC) is performed by the conventional method, the thickness of the molten metal 3 on the outer peripheral surface of the cooling roll 2 cannot be regulated to a thin thickness. In this case, the cooling rate of the molten metal 3 decreases. Therefore, even if an MG treatment that is described later is executed, the thin metal strip 6 having a fine crystallites is not obtained. That is, the half-width of the most intense diffraction line of the alloy particles is less than 0.15 degrees. If the cooling rate decreases, there is also a concern that the alloy particles will not contain a phase with the peak of the most intense diffraction line appearing within a range of 42.0 to 44.0 degrees of a diffraction angle 2θ.

In addition, in a case where the thin metal strip is produced by an apparatus that does not include the blade member 5, it is necessary to make the peripheral speed of the cooling roll 2 fast in order to reduce the thickness of the molten metal 3 on the outer peripheral surface of the cooling roll 2. If the peripheral speed of the roll is fast, the thin metal strip 6 will quickly peel off from the outer peripheral surface of the cooling roll 2. That is, a time period for which the thin metal strip 6 contacts the outer peripheral surface of the cooling roll 2 will shorten. In this case, the thin metal strip 6 will not be subjected to heat dissipation by the cooling roll 2, and will be air-cooled. In a case where the thin metal strip 6 is air-cooled, a sufficient average cooling rate is not obtained. Consequently, the thin metal strip 6 having a fine crystallites is not obtained. That is, the half-width of the most intense diffraction line of the alloy particles is less than 0.15 degrees. In a case where a sufficient average cooling rate is not obtained, there is also a concern that the alloy particles will not contain a phase with the peak of the most intense diffraction line appearing within a range of 42.0 to 44.0 degrees of a diffraction angle 2θ.

[MG Treatment Process]

The specific alloy particles are produced by performing an MG treatment on a specific thin metal strip produced using the production apparatus 1. By this means, the crystallites of the thin metal strip produced by a rapid solidification process are further reduced, and adjusted to the aforementioned half-width.

The thin metal strip may be subjected to preliminary pulverization before performing the MG treatment. In the preliminary pulverization process, a normal ball mill or a vibratory ball mill, an attritor, a pin mill or a disk mill may be used. An example of the vibratory ball mill is a device with the trade name "mixer mill MM400" manufactured by Verder Scientific Co., Ltd.

MG treatment includes the following processes. First, the thin metal strip is inserted together with balls in an MG device such as an attritor or a vibratory ball mill. An addition agent for preventing granulation may also be inserted in the MG device together with the balls.

Next, a process of subjecting the thin metal strip inside the MG device to pulverization with high energy, and a process of compression-bonding together the as-pulverized alloy particles are repeated. By this means, specific alloy particles having the aforementioned half-width (crystallite diameter) are produced.

The MG device is, for example, a high-speed planetary mill. An example of a high-speed planetary mill is a high-speed planetary mill with the trade name "High G BX" that is manufactured by Kurimoto Ltd. Preferable production conditions for the MG device are as follows.

Ball ratio: 5 to 80

The term "ball ratio" refers to the mass ratio with respect to the thin metal strip that serves as the raw material, and is defined by the following equation.

Ball ratio=ball mass/thin metal strip mass

If the ball ratio is too small, the half-width will be small. On the other hand, if the ball ratio is too large, the half-width will be large. Accordingly, a preferable ball ratio is in a range of 5 to 80. A more preferable lower limit of the ball ratio is 10, and more preferably is 12. A more preferable upper limit of the ball ratio is 60, and more preferably is 40.

Note that, for example, SUJ2 defined in JIS Standard is used as the starting material for the balls. The diameter of the balls is, for example, from 0.8 mm to 10 mm.

MG treatment time: 1 to 48 hours

If the MG treatment time period is short, the half-width will be small and the crystallite diameter will be large. On the other hand, if the MG treatment time period is long, the half-width will be large and the crystallite diameter will be small. Accordingly, a preferable MG treatment time is in the range of 1 to 48 hours. A preferable lower limit of the MG treatment time is 2 hours, and more preferably is 4 hours. A preferable upper limit of the MG treatment time is 36 hours, and more preferably is 24 hours. Note that, a unit stopping time which is described later is not included in the MG treatment time.

Cooling condition during MG treatment: stop for 30 minutes or more per 3 hours of MG treatment (intermittent operation)

If the temperature of the alloy particles becomes too high during the MG treatment, the crystallites will be large. A preferable temperature of the chiller cooling water of the device during MG treatment is in a range of 1 to 25° C.

In addition, the total stopping time per 3 hours of MG treatment (hereinafter, referred to as "unit stopping time") is set to be not less than 30 minutes. In a case where the MG treatment is performed continuously, even if the chiller cooling water is adjusted to within the aforementioned range, the temperature of the alloy particles will be too high and the crystallites will be large. If the unit stopping time is not less than 30 minutes, the occurrence of a situation in which the temperature of the alloy particles becomes excessively high can be suppressed, and enlargement of the crystallite diameter can also be suppressed.

In the aforementioned MG treatment, polyvinyl pyrrolidone (PVP) can be added as an addition agent for preventing granulation. A preferable added amount of PVP is in a range of 0.5 to 8 mass % with respect to the mass of the thin metal strip (raw material), and more preferably is in a range of 2 to 5 mass %. If the added amount of PVP is in the aforementioned range, it is easy to adjust the mean particle diameter of the alloy particles to within an appropriate range, and adjustment of the mean particle diameter of the alloy particles to within a range of 0.1 to 25 μm in terms of the median diameter (D50) is facilitated. However, in the MG treatment, the mean particle diameter of the alloy particles can be adjusted even if the addition agent is not added.

The specific alloy particles are produced by the above processes. Another active material (graphite) may contain the specific alloy particles as necessary. A negative electrode active material is produced by the above processes. The negative electrode active material may be a material composed of the specific alloy particles and impurities, or may contain the specific alloy particles and another active material (for example, graphite).

[Method for Producing Negative Electrode]

A negative electrode that uses the negative electrode active material according to the present embodiment can be produced, for example, by the following well-known method.

A binder such as polyvinylidene fluoride (PVDF), polymethyl methacrylate (PMMA), polytetrafluoroethylene (PTFE) or styrene-butadiene rubber (SBR) is mixed with the aforementioned negative electrode active material to produce a mixture. Furthermore, to impart sufficient conductivity to the negative electrode, carbon material powder such as natural graphite, artificial graphite or acetylene black is mixed in the aforementioned mixture to produce a negative electrode compound. After dissolving the binder by adding a solvent such as N-methylpyrrolidone (NMP), dimethylformamide (DMF) or water, the negative electrode compound is sufficiently agitated using a homogenizer or glass beads if necessary to thereby form the negative electrode compound into a slurry. The slurry is applied onto a support body such as rolled copper foil or an electrodeposited copper foil and is dried. Thereafter, the dried product is subjected to pressing. A negative electrode is produced by the above processes.

From the viewpoint of the mechanical strength and battery characteristics of the negative electrode, the amount of the binder to be admixed is preferably in a range of 1 to 10 mass % relative to the amount of the negative electrode compound. The support body is not limited to a copper foil. The support body may be, for example, a thin foil of another metal such as stainless steel or nickel, a net-like sheet punching plate, or a mesh braided with a metal element wire or the like.

[Method for Producing Battery]

A nonaqueous electrolyte secondary battery according to the present embodiment includes the negative electrode as described above, a positive electrode, a separator, and an electrolytic solution or electrolyte. The shape of the battery may be cylindrical or a square shape, or may be a coin shape or a sheet shape or the like. The battery of the present embodiment may also be a battery that utilizes a solid electrolyte, such as a polymer battery.

In the battery of the present invention, it suffices that the negative electrode active material in a discharged state satisfies the requirements specified for the negative electrode active material of the present invention.

The positive electrode of the battery of the present embodiment preferably contains a lithium (Li)-containing transition-metal compound as the active material. The Li-containing transition-metal compound is, for example, $LiM_{1-x}M'_xO_2$ or $LiM_{2y}M'O_4$. Where, in the chemical Formulae, $0 \leq x$, $y \leq 1$, and M and M' are respectively at least one type of element selected from barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

The battery of the present embodiment may use other positive electrode materials such as a transition metal chalcogenide; vanadium oxide and a lithium (Li) compound thereof; niobium oxide and a lithium compound thereof; a conjugated polymer that uses an organic conductive substance; a Chevrel-phase compound; activated carbon, or an activated carbon fiber.

The electrolytic solution of the battery of the present embodiment is generally a nonaqueous electrolytic solution in which lithium salt as the supporting electrolyte is dissolved into an organic solvent. Examples of the lithium salt include $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr, and LiI. These lithium salts may be used singly or in a combination of two types of more.

The organic solvent is preferably a carbonic ester such as propylene carbonate, ethylene carbonate, ethyl methyl carbonate, dimethyl carbonate or diethyl carbonate. However, other various kinds of organic solvents including carboxylate ester and ether are usable. These organic solvents may be used singly or in a combination of two types of more.

The separator is disposed between the positive electrode and the negative electrode. The separator serves as an insulator. Further, the separator greatly contributes to retention of the electrolyte. The battery of the present embodiment may include a well-known separator. The separator is made of, for example, polypropylene or polyethylene, which are polyolefin-based materials, or a mixed fabric of the two materials, or is a porous body such as a glass filter.

The above described negative electrode, positive electrode, separator, and electrolytic solution or electrolyte are enclosed in a container for a battery, to thereby produce a battery.

Hereinafter, the negative electrode active material, the negative electrode, and the battery of the present embodiment described above will be described in more detail using examples. Note that the negative electrode active material, the negative electrode, and the battery of the present embodiment are not limited to the examples described below.

EXAMPLES

With respect to the compositions of Test Nos. 1 to 31 shown in Table 3, alloy particles, a negative electrode active material, a negative electrode, a coin battery and a laminated cell battery were produced under the conditions shown in Table 4 and Table 5. With regard to the respective Test Nos. shown in Table 4 and Table 5, X-ray diffraction measurement was performed on (I) as-pulverized alloy particles, (II) post-MG alloy particles, (III) the negative electrode active material before charging, (IV) after initial charging, (V) after initial discharging, (VI) after 20 cycles of charging, and (VII) after 20 cycles of discharging. Based on the obtained X-ray profiles, with respect to (I), the crystal structure was determined. With respect to (II), the half-width was analyzed, and with respect to (III) to (VII) changes in the X-ray diffraction profiles at the time of charging and discharging were investigated. In addition, the discharge capacity (discharge capacity per volume) and the charge-discharge cycle characteristics of the battery were investigated. Furthermore, the expansion coefficient of a negative electrode active material film on the negative electrode during charging and discharging was investigated.

[Table 3]

TABLE 3

| Test No. | Chemical Composition (alloy particles) | Melted Raw Material (g) | | | |
|---|---|---|---|---|---|
| | | Cu | Sn | Si | Other |
| 1 | Cu-16.0at % Sn-9.0at % Si | 688.9 | 274.5 | 36.5 | — |
| 2 | Cu-20.0at % Sn-9.0at % Si | 632.0 | 332.5 | 35.4 | — |
| 3 | Cu-22.0at % Sn-9.0at % Si | 604.9 | 360.2 | 34.9 | — |
| 4 | Cu-20.0at % Sn-8.0at % Si | 637.8 | 330.9 | 31.3 | — |
| 5 | Cu-22.0at % Sn-8.0at % Si | 610.7 | 358.5 | 30.8 | — |
| 6 | Cu-17.0at % Sn-5.0at % Si | 696.7 | 283.6 | 19.7 | — |
| 7 | Cu-18.0at % Sn-6.0at % Si | 676.9 | 299.5 | 23.6 | — |
| 8A-8I | Cu-20.0at % Sn-6.0at % Si | 649.1 | 327.7 | 23.3 | — |
| 9A, 9B | Cu-16.0at % Sn-3.5at % Si | 719.2 | 267.0 | 13.8 | — |
| 10 | Cu-20.0at % Sn-4.0at % Si | 660.2 | 324.5 | 15.4 | — |
| 11 | Cu-22.0at % Sn-4.0at % Si | 633.2 | 351.6 | 15.1 | — |
| 12 | Cu-20.0at % Sn-8.0at % Si-1.0at % Ti | 630.3 | 331.6 | 31.4 | Ti: 6.7 |
| 13 | Cu-20.0at % Sn-8.0at % Si-1.0at % V | 630.0 | 331.5 | 31.4 | V: 7.11 |
| 14 | Cu-20.0at % Sn-8.0at % Si-1.0at % Cr | 629.9 | 331.4 | 31.4 | Cr: 7.26 |
| 15 | Cu-20.0at % Sn-8.0at % Si-1.0at % Mn | 629.7 | 331.3 | 31.4 | Mn: 7.67 |
| 16 | Cu-20.0at % Sn-8.0at % Si-1.0at % Fe | 629.6 | 331.3 | 31.4 | Fe: 7.79 |
| 17 | Cu-20.0at % Sn-8.0at % Si-1.0at % Co | 629.3 | 331.1 | 31.3 | Co: 8.22 |
| 18 | Cu-20.0at % Sn-8.0at % Si-2.0at % Ni | 629.3 | 331.1 | 31.3 | Ni: 8.19 |
| 19 | Cu-20.0at % Sn-8.0at % Si-2.0at % Zn | 628.8 | 330.8 | 31.3 | Zn: 9.11 |
| 20 | Cu-20.0at % Sn-8.0at % Si-2.0at % Al | 632.1 | 332.6 | 31.5 | Al: 3.78 |
| 21 | Cu-20.0at % Sn-8.0at % Si-1.0at % B | 633.6 | 333.4 | 31.6 | B: 1.52 |
| 22 | Cu-20.0at % Sn-8.0at % Si-1.0at % C | 633.5 | 333.3 | 31.5 | C: 1.69 |
| 23 | 100% Si | — | — | 1000.0 | — |
| 24 | Cu-28.0at % Sn-2.0at % Si | 568.3 | 424.6 | 7.2 | — |
| 25 | Cu-28.0at % Sn-16.0at % Si | 485.4 | 453.3 | 61.3 | — |
| 26 | Cu-15.0at % Sn-28.0at % Si | 585.3 | 287.7 | 127.1 | — |
| 27 | Cu-4.0at % Sn-2.0at % Si | 918.4 | 73.0 | 8.6 | — |
| 28 | Cu-2.0at % Sn-28.0at % Si | 812.9 | 43.4 | 143.7 | — |
| 29 | Cu-2.0at % Sn-6.0at % Si | 935.1 | 38.0 | 27.0 | — |
| 30 | Cu-28.0at % Sn-5.0at % Si | 551.4 | 430.4 | 18.2 | — |
| 31 | Cu-24.5at % Sn-0.1at % Si | 622.1 | 377.6 | 0.4 | — |

TABLE 4

| Test No. | As-pulverized Alloy Particles Formed Phases | SC Condition | MG Condition | Post-MG Alloy Particles | | Alloy Particles Mean Particle Diameter (D50/μm) |
|---|---|---|---|---|---|---|
| | | | | Half-width Δ2θ (degree) | Crystallite Diameter (nm) | |
| 1 | δ | Condition 1 | Condition 1 | 0.99 | 9.5 | 1.9 |
| 2 | D0$_3$ | Condition 1 | Condition 1 | 0.85 | 11.1 | 2.5 |
| 3 | D0$_3$ + δ | Condition 1 | Condition 1 | 0.99 | 9.5 | 2.1 |
| 4 | D0$_3$ | Condition 1 | Condition 1 | 1.06 | 8.8 | 2.0 |
| 5 | D0$_3$ | Condition 1 | Condition 1 | 1.03 | 9.1 | 2.0 |
| 6 | δ | Condition 1 | Condition 1 | 1.06 | 8.8 | 1.8 |
| 7 | δ | Condition 1 | Condition 1 | 0.87 | 10.9 | 2.4 |
| 8A | D0$_3$ | Condition 1 | Condition 1 | 1.05 | 8.9 | 1.7 |
| 8E | ε, η' | Condition 2 | — | — | — | 40.9 |

TABLE 4-continued

| Test No. | As-pulverized Alloy Particles Formed Phases | SC Condition | MG Condition | Post-MG Alloy Particles Half-width Δ2θ (degree) | Crystallite Diameter (nm) | Alloy Particles Mean Particle Diameter (D50/μm) |
|---|---|---|---|---|---|---|
| 8F | D0$_3$ | Condition 1 | Condition 2 | 0.22 | 52.4 | 14.5 |
| 8G | D0$_3$ | Condition 1 | Condition 3 | 2.30 | 4.0 | 0.5 |
| 8H | D0$_3$ | Condition 1 | Condition 4 | 3.50 | 2.6 | 0.1 |
| 8I | D0$_3$ | Condition 1 | Condition 5 | 0.14 | 99.0 | 35.6 |
| 9A | D0$_3$ + δ | Condition 1 | Condition 1 | 0.99 | 9.5 | 2.6 |
| 9B | ε, η' | Condition 2 | — | — | — | 40.4 |
| 10 | δ | Condition 1 | Condition 1 | 1.01 | 9.3 | 2.5 |
| 11 | δ | Condition 1 | Condition 1 | 1.03 | 9.1 | 1.9 |
| 12 | D0$_3$ | Condition 1 | Condition 1 | 0.97 | 9.7 | 2.4 |
| 13 | D0$_3$ | Condition 1 | Condition 1 | 0.97 | 9.7 | 1.8 |
| 14 | D0$_3$ | Condition 1 | Condition 1 | 0.90 | 10.5 | 2.3 |
| 15 | D0$_3$ | Condition 1 | Condition 1 | 1.06 | 8.8 | 1.8 |
| 16 | D0$_3$ | Condition 1 | Condition 1 | 0.85 | 11.1 | 2.3 |
| 17 | D0$_3$ | Condition 1 | Condition 1 | 1.01 | 9.3 | 1.7 |
| 18 | D0$_3$ | Condition 1 | Condition 1 | 0.97 | 9.7 | 2.6 |
| 19 | D0$_3$ | Condition 1 | Condition 1 | 1.08 | 8.6 | 1.7 |
| 20 | D0$_3$ | Condition 1 | Condition 1 | 0.90 | 10.5 | 2.1 |
| 21 | D0$_3$ | Condition 1 | Condition 1 | 0.87 | 10.9 | 2.4 |
| 22 | D0$_3$ | Condition 1 | Condition 1 | 1.01 | 9.3 | 1.9 |
| 23 | Si Phase | — | — | — | — | 15.3 |
| 24 | ε, η' | Condition 1 | Condition 1 | — | — | 2.3 |
| 25 | Sn, η' | Condition 1 | Condition 1 | — | — | 2.0 |
| 26 | Sn, η' | Condition 1 | Condition 1 | — | — | 3.1 |
| 27 | Cu (Solid Solution) | Condition 1 | Condition 1 | — | — | 3.2 |
| 28 | Cu—Si Compound | Condition 1 | Condition 1 | — | — | 2.7 |
| 29 | Cu (Solid Solution) | Condition 1 | Condition 1 | — | — | 1.9 |
| 30 | ε, η' | Condition 1 | Condition 1 | — | — | 2.6 |
| 31 | ε | Condition 1 | Condition 1 | — | — | 2.4 |

TABLE 5

| Test No. | Coin Battery Characteristics | | | | | Laminated Cell Battery Characteristics | |
|---|---|---|---|---|---|---|---|
| | Initial Charge Capacity (mAh/cm$^3$) | Initial Discharge Capacity (mAh/cm$^3$) | Initial Efficiency (%) | Discharge Capacity at 100 cycles (mAh/cm$^3$) | Capacity Retention Ratio (%) | Initial Charge Capacity (mAh/cm$^3$) | Initial Discharge Capacity (mAh/cm$^3$) |
| 1 | 4186 | 3376 | 81 | 2996 | 89 | 2138 | 1827 |
| 2 | 4264 | 3575 | 84 | 3187 | 89 | 2126 | 1884 |
| 3 | 4374 | 3655 | 84 | 3299 | 90 | 2276 | 1976 |
| 4 | 4239 | 3547 | 84 | 3147 | 89 | 2067 | 1846 |
| 5 | 4323 | 3628 | 84 | 3246 | 89 | 2306 | 2000 |
| 6 | 4092 | 3316 | 81 | 3006 | 91 | 2047 | 1751 |
| 7 | 3998 | 3375 | 84 | 3100 | 92 | 2043 | 1833 |
| 8A | 4057 | 3461 | 85 | 3149 | 91 | 2136 | 1891 |
| 8E | 3011 | 1948 | 65 | 807 | 41 | 1699 | 1099 |
| 8F | 2873 | 2352 | 82 | 1943 | 83 | 1670 | 1429 |
| 8G | 4425 | 3663 | 83 | 2948 | 80 | 2133 | 1849 |
| 8H | 4418 | 3704 | 84 | 1945 | 53 | 2241 | 1936 |
| 8I | 1856 | 823 | 44 | 728 | 88 | 1263 | 830 |
| 9A | 2537 | 2134 | 84 | 1940 | 91 | 1473 | 1323 |
| 9B | 2410 | 1494 | 62 | 672 | 45 | 1210 | 629 |
| 10 | 3931 | 3252 | 83 | 2880 | 89 | 2114 | 1870 |
| 11 | 4318 | 3510 | 81 | 3142 | 90 | 2093 | 1750 |
| 12 | 4200 | 3461 | 82 | 3066 | 89 | 2259 | 1959 |
| 13 | 4183 | 3419 | 82 | 3007 | 88 | 2090 | 1796 |
| 14 | 4208 | 3528 | 84 | 3142 | 89 | 2089 | 1848 |
| 15 | 4096 | 3326 | 81 | 2932 | 88 | 2187 | 1879 |
| 16 | 4133 | 3376 | 82 | 2922 | 87 | 2057 | 1803 |
| 17 | 3931 | 3184 | 81 | 2828 | 89 | 2087 | 1746 |
| 18 | 3763 | 3105 | 83 | 2870 | 92 | 1924 | 1704 |
| 19 | 4362 | 3592 | 82 | 3338 | 93 | 2253 | 1948 |
| 20 | 4229 | 3744 | 89 | 3095 | 83 | 2131 | 1901 |
| 21 | 3763 | 3067 | 81 | 2731 | 89 | 2062 | 1806 |
| 22 | 3377 | 2722 | 81 | 2506 | 92 | 1816 | 1542 |

TABLE 5-continued

| | | | | | | | |
|---|---|---|---|---|---|---|---|
| 23 | 4119 | 2546 | 62 | 221 | 9 | 2358 | 1482 |
| 24 | 7288 | 4735 | 65 | 828 | 17 | 3392 | 2343 |
| 25 | 8113 | 5121 | 63 | 734 | 14 | 3694 | 2482 |
| 26 | 6463 | 4131 | 64 | 855 | 21 | 3001 | 2019 |
| 27 | 473 | 386 | 82 | 302 | 78 | 744 | 687 |
| 28 | 660 | 547 | 83 | 344 | 63 | 841 | 775 |
| 29 | 303 | 260 | 86 | 92 | 35 | 635 | 578 |
| 30 | 8383 | 5048 | 60 | 571 | 11 | 2858 | 1799 |
| 31 | 5855 | 3746 | 64 | 479 | 13 | 1547 | 1011 |

| | Laminated Cell Battery Characteristics | | | | | |
|---|---|---|---|---|---|---|
| Test No. | Initial Efficiency (%) | Discharge Capacity at 100 cycles (mAh/cm$^3$) | Capacity Retention Ratio (%) | $\Delta T$ (μm) | $T_o$ (μm) | Expansion Coefficient (%) |
| 1 | 85 | 1632 | 89 | 11 | 51 | 21 |
| 2 | 89 | 1734 | 92 | 12 | 57 | 21 |
| 3 | 87 | 1829 | 93 | 9 | 49 | 18 |
| 4 | 89 | 1709 | 93 | 10 | 52 | 19 |
| 5 | 87 | 1846 | 92 | 10 | 54 | 19 |
| 6 | 86 | 1621 | 93 | 9 | 49 | 19 |
| 7 | 90 | 1676 | 91 | 11 | 55 | 20 |
| 8A | 89 | 1750 | 93 | 12 | 57 | 21 |
| 8E | 65 | 558 | 51 | 27 | 51 | 52 |
| 8F | 86 | 1275 | 89 | 10 | 52 | 20 |
| 8G | 87 | 1608 | 87 | 10 | 55 | 19 |
| 8H | 86 | 1252 | 65 | 12 | 56 | 21 |
| 8I | 66 | 790 | 95 | 4 | 55 | 8 |
| 9A | 90 | 1201 | 91 | 11 | 56 | 19 |
| 9B | 52 | 271 | 43 | 23 | 56 | 41 |
| 10 | 88 | 1679 | 90 | 7 | 50 | 14 |
| 11 | 84 | 1630 | 93 | 11 | 52 | 21 |
| 12 | 87 | 1731 | 88 | 11 | 55 | 20 |
| 13 | 86 | 1629 | 91 | 13 | 58 | 23 |
| 14 | 88 | 1661 | 90 | 11 | 53 | 21 |
| 15 | 86 | 1721 | 92 | 8 | 54 | 15 |
| 16 | 88 | 1585 | 88 | 11 | 56 | 19 |
| 17 | 84 | 1617 | 93 | 8 | 50 | 15 |
| 18 | 89 | 1634 | 96 | 8 | 51 | 16 |
| 19 | 86 | 1816 | 93 | 11 | 50 | 22 |
| 20 | 89 | 1597 | 84 | 11 | 49 | 22 |
| 21 | 88 | 1667 | 92 | 10 | 53 | 18 |
| 22 | 85 | 1435 | 93 | 11 | 50 | 21 |
| 23 | 63 | 121 | 8 | 47 | 49 | 96 |
| 24 | 69 | 861 | 37 | 25 | 54 | 46 |
| 25 | 67 | 830 | 33 | 37 | 58 | 63 |
| 26 | 67 | 835 | 41 | 29 | 50 | 58 |
| 27 | 92 | 658 | 96 | 4 | 49 | 9 |
| 28 | 92 | 682 | 88 | 7 | 57 | 12 |
| 29 | 91 | 539 | 93 | 6 | 56 | 11 |
| 30 | 63 | 516 | 29 | 44 | 51 | 87 |
| 31 | 65 | 343 | 34 | 36 | 48 | 75 |

The methods for producing the alloy particles, negative electrode active material, negative electrode, coin battery and laminated cell battery of each Test No other than Test No. 23 were as follows. Note that, other than in Test No. 23 in which a powder reagent of pure Si as a negative electrode active material was pulverized using an automatic mortar and used as alloy particles, the methods for producing the negative electrode active material, negative electrode, coin battery and laminated cell battery were as follows.

[Production of Alloy Particles]

Molten metal was produced so that the chemical compositions of powdered alloy particles became the chemical compositions shown in Table 3. For example, in the case of Test No. 1, molten metal was produced so that the chemical composition of the powdered alloy particles contained Cu-16.0 at % Sn-9.0 at % Si, that is, 16.0 at % of Sn and 9.0 at % of Si, with the balance being Cu and impurities. The molten metal was produced by subjecting a raw material containing the metals (unit is g) shown in the "melted raw material" column in Table 3 to high-frequency melting.

After stabilizing the molten metal at 1200° C., the molten metal was rapidly cooled according to the condition shown in Table 4, and in the case of condition 1 in the "SC condition" column in Table 4, a thin metal strip having a thickness of 70 μm was cast, and in the case of condition 2 in the "SC condition" column in Table 4, a thin metal strip having a thickness of 300 μm was cast.

In the case of condition 1 in the "SC condition" column in Table 4, the thin metal strip was produced by the strip casting (SC) method of the aforementioned embodiment using the production apparatus shown in FIG. 3. Specifically, a water-cooled cooling roll made of copper was used. The rotational speed of the cooling roll was set as 300 m/min with respect to the circumferential speed of the roll surface. In an argon atmosphere, the aforementioned molten metal was supplied onto the rotating water-cooled roll through a horizontal tundish (made of alumina). The molten metal was raised on the rotating water-cooled roll such that the molten metal was subjected to rapid solidification. The width of the gap between the blade member and the water-cooled roll was 80 μm. The blade member was made of alumina.

In the case of condition 2 in the "SC condition" column in Table 4, unlike condition 1, the blade member was not used and the rotational speed of the cooling roll was set as 120 m/min with respect to the circumferential speed of the roll surface. The other conditions were the same as for condition 1. That is, in the case of condition 2, the thin metal strip was produced by the conventional SC method.

A pulverization treatment and an MG treatment were performed on the obtained thin metal strip, and alloy particles that were a negative electrode active material were produced. In Test Nos. 8E, 9B and 23, an MG treatment was not performed after the pulverization treatment.

[Production of Alloy Particles (as-Pulverized Alloy Particles) by Pulverization Treatment]

Other than Test No. 23, the produced thin metal strip was subjected to a pulverization treatment using a mixer mill. Specifically, the thin metal strip was subjected to a pulverization treatment using a mixer mill (apparatus model name: MM400) manufactured by Verder Scientific Co., Ltd. A container made of stainless steel that had an internal volume of 25 cm$^3$ was used as the pulverizing container. Two balls made of the same material as the pulverizing container and having a diameter of 15 mm as well as 3 g of a thin metal strip were placed in the pulverizing container, the setting value for the vibration frequency was 25 rps, and the mixer mill was operated for 240 seconds to produce alloy particles. The amount required for the MG treatment was secured. For example, in the case of MG condition 2, the amount of required material corresponded to the amount of 14 treatments with the mixer mill pulverizing container. Further, for the identification of "as-pulverized alloy particles formed phases" in Table 4, the alloy particles (as-pulverized alloy particles) obtained by this process were used. These as-pulverized alloy particles were also the specific alloy powder that was used for the analysis in Table 1 and Table 2, and particles recovered with a 45-μm minus sieve of were used for X-ray diffraction measurement.

[Production of Alloy Particles by MG Treatment (Post-MG Alloy Particles)]

After the pulverization treatment, the alloy particles of the Test Nos. other than Test Nos. 8E, 9B and 23 were also subjected to an MG treatment. Specifically, a thin metal strip, graphite powder (mean particle diameter of 5 μm in terms of median diameter D50), and PVP were mixed at ratios shown in condition 1 to condition 5 described hereunder. The mixture was subjected to an MG treatment under the condition described in the "MG condition" column shown in Table 4 using a high-speed planetary mill (trade name "High G BX", manufactured by Kurimoto Ltd) in an argon gas atmosphere. The MG treatment was not performed for the Test Nos. (8E, 9B and 23) for which "-" is described in the "MG condition" column. The "MG conditions" other than "-" were as follows.

[Condition 1]
Rotational speed: 200 rpm (equivalent to centrifugal acceleration of 12 G)
Ball ratio: 15 (thin metal strip material:balls=40 g:600 g)
Graphite: 6 mass %
PVP: 4 mass %
MG treatment time period: 12 hours
Stopping time per 3 hours of MG treatment: 30 minutes

[Condition 2]
Rotational speed: 200 rpm (equivalent to centrifugal acceleration of 12 G)
Ball ratio: 6 (thin metal strip material:balls=100 g:600 g)
Graphite: 6 mass %
PVP: 1 mass %
MG treatment time period: 2 hours
Stopping time per 3 hours of MG treatment: 0 minutes

[Condition 3]
Rotational speed: 200 rpm (equivalent to centrifugal acceleration of 12 G)
Ball ratio: 75 (thin metal strip material:balls=8 g:600 g)
Graphite: 6 mass %
PVP: 7 mass %
MG treatment time period: 45 hours
Stopping time per 3 hours of MG treatment: 30 minutes

[Condition 4]
Rotational speed: 200 rpm (equivalent to centrifugal acceleration of 12 G)
Ball ratio: 150 (thin metal strip material:balls=4 g:600 g)
Graphite: 6 mass %
PVP: 4 mass %
MG treatment time period: 100 hours
Stopping time per 3 hours of MG treatment: 30 minutes

[Condition 5]
Rotational speed: 150 rpm (equivalent to centrifugal acceleration of 7 G)
Ball ratio: 4 (thin metal strip material:balls=150 g:600 g)
Graphite: 6 mass %
PVP: none
MG treatment time period: 12 hours
Stopping time per 3 hours of MG treatment: 0 minutes The temperature of the chiller cooling water was in a range of 1 to 25° C. for each of the conditions for the MG treatment.

Alloy particles that were negative electrode active materials were produced by the foregoing processes.

[Identification of Crystal Structure of Alloy Particles and Measurement of Half-Width and Crystallite Diameter]

The produced alloy particles were subjected to processes in which the crystal structure was identified, and the half-width, the crystallite diameter, and the mean particle diameter were measured.

[Identification of Crystal Structure]

The as-pulverized alloy particles were subjected to X-ray diffraction measurement, and measured data of the X-ray diffraction profiles was obtained. Specifically, SmartLab (rotor target maximum output 9 KW; 45 kV-200 mA) manufactured by Rigaku Co., Ltd. was used to obtain X-ray diffraction profiles of the powder of the negative electrode active materials. The crystal structure of the alloy particles was analyzed by the Rietveld method based on the obtained X-ray diffraction profiles (measured data). The X-ray diffraction apparatus and measurement conditions were as described below. The constituent phases that were clarified as a result of the crystal structure analysis are shown in the "as-pulverized alloy particles formed phases" column in Table 4.

[X-Ray Diffraction Apparatus Name and Measurement Conditions]
Apparatus: SmartLab manufactured by Rigaku Co., Ltd.
X-ray tube: Cu-Kα ray
X-ray output: 45 kV, 200 mA
Incident monochromator: Johannson type crystal (which filters out Cu-Kα$_2$ ray and Cu-Kβ ray)
Optical system: Bragg-Brentano geometry
Incident parallel slit: 5.0 degrees
Incident slit: ½ degree Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source—mirror distance: 90.0 mm
X-ray source—selection slit distance: 114.0 mm
X-ray source—sample distance: 300.0 mm
Sample—receiving slit 1 distance: 187.0 mm
Sample—receiving slit 2 distance: 300.0 mm
Receiving slit 1–receiving slit 2 distance: 113.0 mm
Sample—detector distance: 331.0 mm
Detector: D/Tex Ultra
Measurement range: 10 to 120 degrees
Data acquisition angle interval: 0.02 degrees
Scan method: continuous
Scanning speed: 2.0 degrees/min The method of analyzing the crystal structure is described hereunder taking analysis of the alloy particles of Test No. 4 as an example.

Figure 6:
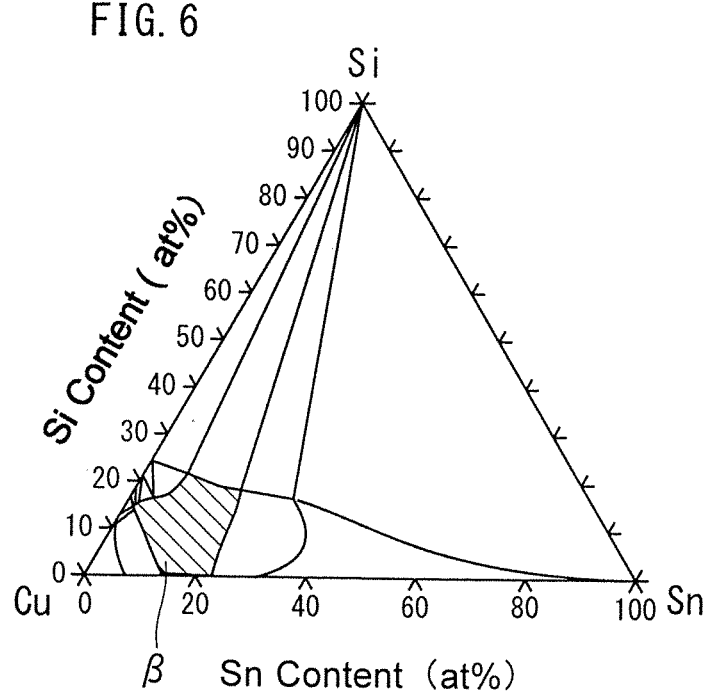
FIG. 6 is a Cu—Sn—Si ternary phase diagram obtained by thermodynamic calculation.

FIG. 6 is a Cu—Sn—Si ternary phase diagram obtained by thermodynamic calculation. Based on FIG. 6, a Cu-20.0 at % Sn-8.0 at % Si alloy at 725° C. is a β-phase with a bcc structure. Therefore, in a case where molten metal having this composition is rapidly cooled and solidified, the alloy necessarily passes through the β-phase region. In a case where the cooling rate is sufficiently high when passing through the β-phase region, it is predicted that almost the total amount of constituent phases composed of $D0_3$ phase and/or δ phase are liable to be formed as metastable phases. It was also verified experimentally that, in the case of a Cu—Sn—Si ternary alloy, when the alloy has a chemical composition containing, in at %, Sn: 13.0 to 24.5% and Si: 3.0 to 15.0%, with the balance being Cu and impurities, in a case where the alloy is rapidly cooled and solidified at a sufficiently fast cooling rate, almost the total amount of constituent phases composed of $D0_3$ phase and/or δ phase can be formed as a metastable state.

The crystal structure of the $D0_3$ phase is a cubic crystal, and as described above, corresponds to No. 225 (Fm-3m) of International Table (Volume-A) in the classification of space groups. Further, the crystal structure of the δ phase is also a cubic crystal, and corresponds to No. 216 (F-43m) of International Table (Volume-A) in the classification of space groups.

Therefore, taking the structure model of this space group number as the initial structure model of the Rietveld analysis, a calculated value of the diffraction profile (hereinafter, referred to as a "calculated profile") of the as-pulverized alloy particles of the corresponding Test No. (in this case, Test No. 4) was found by Rietveld analysis. RIETAN-2000 (program name) was used for the Rietveld analysis.

Figure 7:
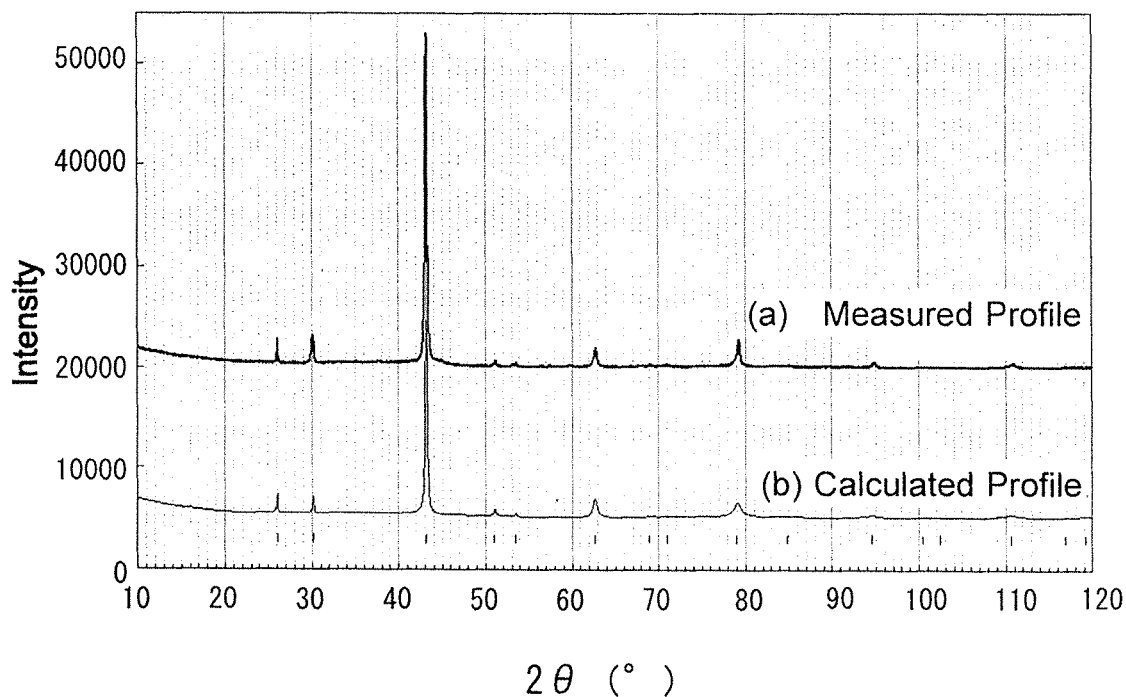
FIG. 7 is a view illustrating an X-ray diffraction profile of "as-pulverized alloy particles (alloy particles obtained by a pulverization treatment in a state prior to a mechanical grinding treatment)" of Test No. 4 in the examples, and a fitting result obtained according to the Rietveld method.

FIG. 7 is a view illustrating an X-ray diffraction profile of "as-pulverized alloy particles" of Test No. 4 of the examples, and a fitting result (after structural refinement analysis) obtained according to the Rietveld method. The profile denoted by reference character (b) in FIG. 7 is a calculated profile of the $D0_3$ structure. Referring to FIG. 7, diffraction peaks of the measured X-ray diffraction profile ((a) in the drawing) mainly matched the calculated profile of (b). Accordingly, it was determined that the almost the entire amount of the alloy particles (negative electrode active material) of Test No. 4 was composed of $D0_3$ phase. The crystal structure and constituent phases of the as-pulverized alloy particles of the other Test Nos. were also identified by a similar method (shown in Table 4).

[Measurement of Half-Width and Crystallite Diameter]

The half-width and crystallite diameter were measured as described below. Although the measurement method is described using Test No. 4 as an example, the same applies with respect to the other Test Nos. also.

Figure 8:
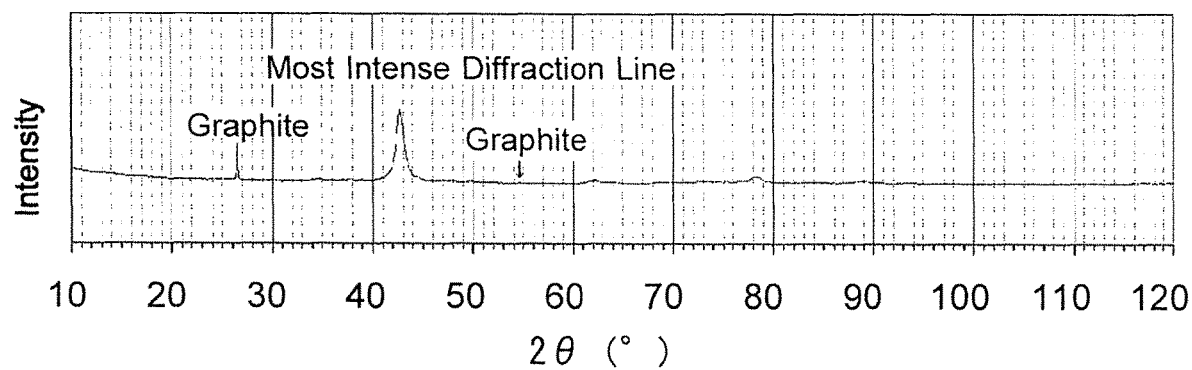
FIG. 8 is a view illustrating an X-ray diffraction profile having a most intense diffraction line that is taken as an object for half-width analysis, that is an X-ray diffraction profile of "post-MG alloy particles (alloy particles obtained by performing a mechanical grinding treatment on as-pulverized alloy particles)" of Test No. 4 in the examples.

FIG. 8 is a view illustrating an X-ray diffraction profile having a most intense diffraction line that is taken as an object for half-width analysis, which is an X-ray diffraction profile of "post-MG alloy particles" of Test No. 4 in the examples. In FIG. 8, in the powder X-ray diffraction profile after MG treatment of Test No. 4, a diffraction line having a largest integrated diffraction intensity originating from the $D0_3$ phase or δ phase was present at 2θ=42.90 degrees. Further, a half-width Δ2θ=B (degrees) of this diffraction line was 1.06 degrees after performing correction for an amount originating from the apparatus.

In addition, the result obtained by determining the crystallite diameter D by analysis using the aforementioned Scherrer equation was D=8.8 nm.

The half-width and crystallite diameter were determined by a similar method for the alloy particles of the other Test Nos. also. The obtained results are shown in Table 4.

[Measurement of Mean Particle Diameter (Median Diameter D50) of Alloy Particles]

The powder particle size distribution of the alloy particles (Test Nos. 8E, 9B and 23) that were produced by only a pulverization treatment and without undergoing an MG treatment was measured by an airflow-type high-speed dynamic image analysis method using an analyzer having the trade name Camsizer X manufactured by Verder Scientific Co., Ltd. The mean particle diameter (median diameter D50) was determined based on the measurement results. The obtained results are shown in Table 4.

On the other hand, the powder particle size distribution of the alloy particles (post-MG alloy particles) that were produced by performing an MG treatment after performing a pulverization treatment was measured using a laser particle size distribution analyzer ("Microtrac particle size distribution analyzer" manufactured by Nikkiso Co., Ltd.). The mean particle diameter (median diameter D50) was determined based on the measured powder particle size distribution. The obtained result is shown in Table 4. Note that, with regard to the mean particle diameter of the alloy particles of Test Nos. 8E, 9B and 23, the numerical values are for a state in which an MG treatment was not performed after the pulverization treatment.

[Production of Negative Electrode for Coin Battery]

For each Test No., a negative electrode compound slurry containing the negative electrode active material was produced using the aforementioned alloy particles as the negative electrode active material. Specifically, the powdered alloy particles, acetylene black (AB) as a conductive additive, styrene-butadiene rubber (SBR) as a binder (2-fold dilution), and carboxymethyl cellulose (CMC) as a thickening agent were mixed in a mass ratio of 75:15:10:5 (blending quantity was 1 g:0.2 g:0.134 g:0.067 g) to produce a mixture. Thereafter, a kneading machine was used to produce a negative electrode compound slurry by adding distilled water to the mixture such that the slurry density was 27.2%. Since the styrene-butadiene rubber was used by being diluted 2-fold with water, 0.134 g of styrene-butadiene rubber was blended when weighing.

The produced negative electrode compound slurry was applied onto a copper foil using an applicator (150 μm). The copper foil on which the slurry was applied was dried at 100° C. for 20 minutes. The copper foil after drying had a coating film composed of the negative electrode active material on the surface. The copper foil having the negative electrode active material film was subjected to punching to produce a disc-shaped copper foil having a diameter of 13 mm. The copper foil after punching was pressed at a press pressure of 500 kgf/cm$^2$ to produce a plate-shaped negative electrode.

[Production of Coin Battery]

The produced negative electrode, EC-DMC-EMC-VC-FEC as the electrolytic solution, a polyolefin separator (φ 17 mm) as the separator, and a metal Li plate (φ 19×1 mmt) as the positive electrode material were prepared. The thus-prepared negative electrode material, electrolytic solution, separator, and positive electrode material were used to produce a 2016 type coin battery. Assembly of the coin battery was performed within a glove box in argon atmosphere.

[Evaluation of Charge-Discharge Characteristics of Coin Battery]

The discharge capacity and cycle characteristics of the battery of each Test No. were evaluated by the following method.

Constant current doping (corresponding to insertion of lithium ions into an electrode, and charging of a lithium ion secondary battery) was performed with respect to the coin battery at a current value of 0.1 mA (a current value of 0.075 mA/cm$^2$) or a current value of 1.0 mA (a current value of 0.75 mA/cm$^2$) until the potential difference with respect to the counter electrode became 0.005 V. Thereafter, the doping capacity was measured by continuing doping with respect to the counter electrode at a constant voltage until the current value became 7.5 μA/cm$^2$ while retaining 0.005 V.

Next, the de-doping capacity was measured by performing de-doping (corresponding to desorption of lithium ions from the electrode, and discharge of the lithium ion secondary battery) at a current value of 0.1 mA (a current value of 0.075 mA/cm$^2$) or a current value of 1.0 mA (a current value of 0.75 mA/cm$^2$) until the potential difference became 1.2 V.

The doping capacity and de-doping capacity correspond to charge capacity and discharge capacity when the electrode is used as the negative electrode of the lithium ion secondary battery. Therefore, the measured doping capacity was defined as "charge capacity" and the measured de-doping capacity was defined as "discharge capacity". Charging and discharging of the coin battery were repeated. The doping capacity and de-doping capacity were measured each time charging and discharging were performed in each cycle. The measurement results were used to obtain the charge-discharge cycle characteristics. Specifically, the charge capacity and the discharge capacity (mAh/cm$^3$), and the initial efficiency for the first (initial) cycle were determined. The initial efficiency is a numerical value shown as a percentage that was obtained by dividing the initial discharge capacity by the initial charge capacity. The initial efficiency is regarded as a ratio at which lithium that was used when charging the alloy particles that is the negative electrode active material can be reversibly taken out.

In addition, the discharge capacity (mAh/cm$^3$) and the capacity retention ratio after 100 cycles were determined. The capacity retention ratio is a numerical value shown as a percentage that was obtained by dividing the discharge capacity after 100 cycles by the initial discharge capacity.

The capacity of the coin battery was calculated as a value that was obtained by deducting the capacity of the conductive additive (acetylene black: AB), which is then divided by the fraction of alloy in the negative electrode compound to convert to the capacity of the elemental alloy. For example, in a case where the ratio in the negative electrode compound was alloy:conductive additive (AB):binder (SBR solid content):CMC=75:15:5:5, after converting the measured charge capacity or discharge capacity to a value per 1 g of the negative electrode compound, the capacitive component of acetylene black (25 mAh/g) was deducted, and the resulting value was multiplied by 6/5 to convert to the capacity of the elemental alloy negative electrode based on the mixture ratio (alloy:AB+binder+CMC=75:25) and thereby calculate the capacity of the coin battery.

The results are shown in Table 5.

[Production of Negative Electrode for Laminated Cell]

A negative electrode for a laminated cell was prepared for each Test No. A negative electrode active material containing the alloy particles of the relevant Test No. described in Table 2 and graphite powder particles was used for the negative electrode for a laminated cell. In this case, as-pulverized alloy particles were used as the alloy particles for Test Nos. 8E, 9B and 23, and post-MG alloy particles were used for the other Test Nos.

The graphite powder particles were produced by the following method. A mixture was produced by admixing 2 mass % of pitch powder into spheroidized natural graphite. The mixture was baked at 1,000° C. in a nitrogen gas stream to produce graphite powder particles. The mean particle diameter D50 (median diameter) of the obtained graphite powder particles was 22 μm.

In the negative electrode active material used for a negative electrode for a laminated cell of each Test No., the content of the alloy particles was set to 20 mass %, and the content of the graphite powder particles was set to 80 mass %. A negative electrode compound slurry containing the negative electrode active material was produced by the following method. The aforementioned mixed active material, acetylene black (AB) as a conductive additive, styrene-butadiene rubber (SBR) as a binder (2-fold dilution), and carboxymethyl cellulose (CMC) as a thickening agent were mixed in a mass ratio of 75:15:10:5 (blending quantity was 1 g:0.2 g:0.134 g:0.067 g). Thereafter, a kneading machine was used to produce a negative electrode compound slurry by adding distilled water to the mixture such that the slurry density was 27.2%. Since the styrene-butadiene rubber was used by being diluted 2-fold with water, 0.134 g of styrene-butadiene rubber was blended when weighing.

The thus-produced negative electrode compound slurry was applied onto a copper foil using an applicator (150 μm). The copper foil on which the slurry was applied was dried at 100° C. for 20 minutes. The copper foil after drying had a coating film (negative electrode active material film) composed of the negative electrode active material on the surface. A negative electrode plate having dimensions of 2.5 cm×2.5 cm was cut out from the copper foil having the negative electrode active material film. The copper foil after cutting was pressed at a press pressure of 500 kgf/cm$^2$ to produce a negative electrode material.

[Production of Positive Electrode Plate for Laminated Cell]

Lithium cobalt oxide was used as an active material for the positive electrode of the laminated cell. This active material, acetylene black (AB) as a conductive additive, and polyvinylidene fluoride (PVdF) as a binder were mixed in a mass ratio of 80:10:10 (blending quantity was 0.8 g:0.1 g:0.1 g). Thereafter, a kneading machine was used to produce a positive electrode compound slurry for which the slurry density was adjusted using N-methyl-2-pyrrolidone (NMP). The thus-produced positive electrode compound slurry was applied onto an aluminum foil using an applicator (150 μm). The aluminum foil on which the slurry was applied was dried at 100° C. for 20 minutes. The aluminum foil after drying had a coating film composed of the positive electrode active material on the surface. A positive electrode plate having dimensions of 2.3 cm×2.3 mm was cut out from the aluminum foil having the coating film. The aluminum foil after cutting was pressed at a press pressure of 500 kgf/cm$^2$ to produce a positive electrode material.

[Production of Laminated Cell Battery]

A laminated cell battery was produced using the above described negative electrode plate and positive electrode plate. The negative electrode plate, EC-DMC-EMC-VC-FEC as the electrolytic solution, a polyolefin separator as the separator, the positive electrode plate of an aluminum collector foil coated with lithium cobalt oxide, an aluminum laminate sheet and, as electrodes, an aluminum tab as a positive electrode and a nickel tab as a negative electrode were prepared. The thus-prepared negative electrode plate, electrolytic solution, separator, positive electrode plate, aluminum laminate sheet, aluminum tab and nickel tab were used to produce a laminated cell battery. Assembly of the structure up to infusion of the electrolytic solution was performed in atmosphere, and the final assembly in which the electrolytic solution was infused and sealed was performed within a glove box in argon atmosphere.

[Measurement of Charge-Discharge Capacity and Expansion Coefficient of Laminated Cell Battery]

Varying behavior in the thickness during repeated charging and discharging of the laminated cell was measured to an accuracy of 0.1 μm by means of a linear gauge on which a photoelectric transmission type linear encoder was mounted. The laminated cell was sandwiched between plates made of Teflon ("Teflon" is a registered trademark), and was fixed in a state in which reinforcing plates made of stainless steel were bolted from both sides thereof.

The film thickness during charging of the negative electrode active material film that was applied onto the negative electrode was measured. An average value ΔT of the film thickness increase amount at the time of charging for five charge-discharge cycles in which the capacity was stabilized, and a film thickness $T_0$ of the negative electrode active material film before charging (this is a value obtained by subtracting the thickness of the copper foil from a thickness measured after allowing the electrolytic solution to sufficiently impregnate into the negative electrode plate including the current collector copper foil prior to production of the laminated cell, and is equivalent to the film thickness when the negative electrode active material compound film is in a swollen state) were measured. The respective measured average values ΔT and film thicknesses $T_0$ are shown in Table 5. Based on the measured average value ΔT and film thickness $T_0$, the expansion coefficient (%) was calculated using the following equation.

Expansion coefficient (%)=measured average value ΔT/measured film thickness $T_0$×100

For example, in the case of Test No. 4, the film thickness $T_0$ of the negative electrode active material film of the laminated cell was 52 μm. The thickness increase amount ΔT at the time of charging of the laminated cell was 10 μm as an average value for five charge-discharge cycles in which the capacity stabilized. Accordingly, the expansion coefficient was 19%.

In addition, the initial discharge capacity (mAh/cm$^3$) of the laminated cell, the initial efficiency (%), the discharge capacity (mAh/cm$^3$) at 100 cycles, and the capacity retention ratio were determined with respect to the capacity per volume as a negative electrode compound that also contained a binder.

For example, in the case of Test No. 4, the volume density of the negative electrode compound that was determined based on the coating mass per unit area and the film thickness $T_0$ was 4.4 g/cm$^3$. The initial charge capacity per mass of the laminated cell was 470 mAh/g, and the measured value of the initial discharge capacity was 420 mAh/g. Accordingly, the initial charge capacity per volume was 2067 mAh/cm$^3$, and the discharge capacity was calculated as 1846 mAh/cm$^3$, and thus the initial efficiency was 89%. Similarly, the discharge capacity after 100 cycles in Test No. 4 was calculated as 1709 mAh/cm$^3$, and the capacity retention ratio was 93%. The corresponding values for the laminated cells of the other Test Nos. were also determined in a similar manner.

[Measurement Results]

Referring to Table 3 to Table 5, the chemical compositions of the post-MG alloy particles of Test Nos. 1 to 7, 8A, 8F, 8G, 9A, and 10 to 22 were appropriate and included a specific alloy phase. Further, the half-width of the most intense diffraction line attributable to the specific alloy phase was within the range of 0.15 to 2.5. Further, the mean particle diameter of the alloy particles was within the range of 0.1 to 25 μm. As a result, with respect to the coin battery characteristics, the discharge capacity was higher than the theoretical capacity of graphite (833 mAh/cm$^3$) with regard to both the initial discharge capacity and the discharge capacity after 100 cycles. In addition, the initial efficiency was 80% or more in each case. Further, the capacity retention ratio was 80% or more in each case. Furthermore, with regard to the laminated cell battery also, the initial discharge capacity and the discharge capacity at the time of the 100 cycles was 1200 mAh/cm$^3$ or more, the initial efficiency was 80% or more, and the capacity retention ratio was 84% or more. In addition, the expansion coefficient was not more than 25% in each case. Note that, in each of the aforementioned Test Nos., the aforementioned half-width in the X-ray diffraction profile of the negative electrode active material in the battery before charging and in the battery after 20 cycles of discharging was substantially the same as the corresponding half-width of the post-MG alloy particles. On the other hand, the aforementioned half-width in the X-ray diffraction profile of the negative electrode active material in the battery after 20 cycles of charging was larger than the corresponding half-width of the post-MG alloy particles.

On the other hand, in Test No. 8E, the thin metal strip was produced by the conventional SC method. As a result, the alloy particles did not contain the specific alloy phases, ands phase and phase that are equilibrium phases were formed. Further, the mean particle diameter of the as-pulverized alloy particles was more than 25 μm. In addition, in the coin battery made using the alloy particles of Test No. 8E, although the initial discharge capacity was more than the theoretical capacity of graphite (833 mAh/cm$^3$), the initial efficiency was 65%, the discharge capacity at 100 cycles was 807 mAh/cm$^3$, and the capacity retention ratio was 41%, which are low values. Furthermore, in the laminated cell battery also, the initial discharge capacity was less than 1200 mAh/cm$^3$, the initial efficiency was 65%, the discharge capacity at 100 cycles was 558 mAh/cm$^3$, and the capacity retention ratio was 51%, which are low values. In addition, the expansion coefficient was as high as 52%.

In Test No. 8H, the MG treatment time period was too long. As a result, the half-width was as wide as 3.50, and the crystallite diameter of the alloy particles was too small. Therefore, the capacity retention ratio of the coin battery characteristics was as low as 53%, and the capacity retention ratio of the laminated cell battery characteristics was also as low as 65%.

In Test No. 81, there was no unit stopping time. Consequently, the half-width was as narrow as 0.14, and the crystallite diameter was too large. Consequently, with respect to both the coin battery characteristics and the laminated cell battery characteristics, the initial discharge capacity was low, the initial efficiency was low, and the discharge capacity at 100 cycles was also low.

In Test No. 9B, the thin metal strip was produced by the conventional SC method. As a result, the alloy particles did not contain the specific alloy phases, and ε phase and η' phase that are equilibrium phases were formed. Therefore, the mean particle diameter of the post-MG alloy particles was more than 25 μm. In addition, in the coin battery made using the alloy particles of Test No. 9B, although the initial discharge capacity was more than the theoretical capacity of graphite (833 mAh/cm$^3$), the initial efficiency was 62%, the discharge capacity at 100 cycles was 672 mAh/cm$^3$, and the capacity retention ratio was 45%, which are low values. Furthermore, in the laminated cell battery also, the initial discharge capacity was less than 1200 mAh/cm$^3$, the initial efficiency was 52%, the discharge capacity at 100 cycles was 271 mAh/cm$^3$, and the capacity retention ratio was 43%, which are low values. In addition, the expansion coefficient was as high as 41%.

In Test No. 23, a powder reagent of pure Si as a negative electrode active material was pulverized using an automatic mortar and used. As a result, the initial efficiency of the coin battery and the laminated cell battery was less than 80%, the discharge capacity at 100 cycles was less than 833 mAh/cm$^3$, and the capacity retention ratio was a remarkably low value that was less than 80%. In addition, the expansion coefficient of the laminated cell battery was as high as 96%. It is considered that because Si was used as the negative electrode active material, the volumetric expansion and contraction at the time of occlusion and discharge of lithium ions was too large, and consequently the capacity retention ratio was low.

In Test Nos. 24 to 31, the chemical composition was not appropriate. Therefore, the crystal structures of these alloy particles did not contain the specific alloy phases. Specifically, in Test Nos. 24 to 26 and 30 and 31, the η' phase, ε phase or Sn phase or the like were the main constituents. The crystal structure of the alloy particles of Test Nos. 27 to 29 was estimated as being a solid solution of Cu or a Cu—Si compound. As a result, in Test Nos: 27 to 29 the initial discharge capacity was low. In addition, the initial efficiency was less than 80% (excluding Test Nos. 27 to 29), the discharge capacity at 100 cycles was less than 833 mAh/cm$^3$ (excluding Test No. 26), and the capacity retention ratio was a low value that was less than 80% (excluding the coin battery of Test No. 26, and the laminated cell batteries of Test Nos. 27 to 29). Furthermore, the expansion coefficient was more than 25% (excluding Test No. 27 to 29).

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

The invention claimed is:

1. A negative electrode active material, comprising:
    alloy particles having a chemical composition consisting of, in at %:
        Sn: 13.0 to 24.5%, and
        Si: 3.0 to 15.0%,
        with the balance being Cu and impurities;
    wherein:
        the alloy particles contain a phase with a peak of a most intense diffraction line appearing in a range of 42.0 to 44.0 degrees of a diffraction angle 2θ, the most intense diffraction line being a diffraction line having a largest integrated diffraction intensity in an X-ray diffraction profile; and
        a half-width of the most intense diffraction line of the alloy particles is in a range of 0.5 to 2.5 degrees.

2. The negative electrode active material according to claim 1, wherein contents of Sn and Si in the chemical composition are:
    Sn: 15.5 to 22.5%, and
    Si: 3.0 to 9.5%.

3. The negative electrode active material according to claim 1, wherein the chemical composition further contains, in place of a part of Cu:
    one or more types of element selected from a group consisting of Ti, V, Cr, Mn, Fe, Co, Ni, Zn, Al, B and C.

4. The negative electrode active material according to claim 2, wherein the chemical composition further contains, in place of a part of Cu:
    one or more types of element selected from a group consisting of Ti, V, Cr, Mn, Fe, Co, Ni, Zn, Al, B and C.

5. The negative electrode active material according to claim 3, wherein the chemical composition contains one or more types of element selected from a group consisting of:
    Ti: 2.0% or less,
    V: 2.0% or less,
    Cr: 2.0% or less,
    Mn: 2.0% or less,
    Fe: 2.0% or less,
    Co: 2.0% or less,
    Ni: 3.0% or less,
    Zn: 3.0% or less,
    Al: 3.0% or less,
    B: 2.0% or less, and
    C: 2.0% or less.

6. The negative electrode active material according to claim 4, wherein the chemical composition contains one or more types of element selected from a group consisting of:
    Ti: 2.0% or less,
    V: 2.0% or less,
    Cr: 2.0% or less,
    Mn: 2.0% or less,
    Fe: 2.0% or less,
    Co: 2.0% or less,
    Ni: 3.0% or less,
    Zn: 3.0% or less,
    Al: 3.0% or less,
    B: 2.0% or less, and
    C: 2.0% or less.

7. The negative electrode active material according to claim 1, wherein
    a mean particle diameter of the alloy particles is, in terms of median diameter, in a range of 0.1 to 25 μm.

8. The negative electrode active material according to claim 2, wherein
    a mean particle diameter of the alloy particles is, in terms of median diameter, in a range of 0.1 to 25 μm.

9. The negative electrode active material according to claim 3, wherein a mean particle diameter of the alloy particles is, in terms of median diameter, in a range of 0.1 to 25 µm.

10. The negative electrode active material according to claim 4, wherein
a mean particle diameter of the alloy particles is, in terms of median diameter, in a range of 0.1 to 25 µm.

11. The negative electrode active material according to claim 5, wherein
a mean particle diameter of the alloy particles is, in terms of median diameter, in a range of 0.1 to 25 µm.

12. The negative electrode active material according to claim 6, wherein
a mean particle diameter of the alloy particles is, in terms of median diameter, in a range of 0.1 to 25 µm.

13. A negative electrode that comprises the negative electrode active material according to claim 1.

14. A negative electrode that comprises the negative electrode active material according to claim 2.

15. A battery that comprises the negative electrode according to claim 13.

16. A battery that comprises the negative electrode according to claim 14.

* * * * *